(12) United States Patent
Liu et al.

(10) Patent No.: US 8,977,253 B2
(45) Date of Patent: Mar. 10, 2015

(54) METHOD FOR SENDING AUXILIARY DETECTION SIGNALING

(75) Inventors: Kun Liu, Shenzhen (CN); Zhaohua Lu, Shenzhen (CN); Ying Liu, Shenzhen (CN); Feng Xie, Shenzhen (CN); Yang Liu, Shenzhen (CN); Hongyun Qu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 432 days.

(21) Appl. No.: 13/143,198

(22) PCT Filed: Dec. 24, 2009

(86) PCT No.: PCT/CN2009/075998
§ 371 (c)(1),
(2), (4) Date: Jul. 4, 2011

(87) PCT Pub. No.: WO2010/078806
PCT Pub. Date: Jul. 15, 2010

(65) Prior Publication Data
US 2011/0269451 A1  Nov. 3, 2011

(30) Foreign Application Priority Data

Jan. 7, 2009 (CN) .......................... 2009 1 0000601

(51) Int. Cl.
*H04W 24/00* (2009.01)
*H04W 48/12* (2009.01)
*H04W 4/08* (2009.01)

(52) U.S. Cl.
CPC ................ *H04W 48/12* (2013.01); *H04W 4/08* (2013.01); *Y02B 60/50* (2013.01)
USPC ............................ 455/423; 455/424; 455/466

(58) Field of Classification Search
USPC .......................................... 455/423, 424, 466
See application file for complete search history.

(56) References Cited

U.S. PATENT DOCUMENTS

| | | | |
|---|---|---|---|
| 6,990,324 B2 | 1/2006 | Laroia et al. | |
| 7,190,944 B2 | 3/2007 | Kim | |
| 7,620,014 B1 * | 11/2009 | Marques-Pucheu et al. | . 370/330 |
| 7,974,224 B2 * | 7/2011 | Tillet et al. | ..................... 370/296 |
| 2004/0053615 A1 | 3/2004 | Kim | |

(Continued)

FOREIGN PATENT DOCUMENTS

| | | |
|---|---|---|
| CN | 1731884 A | 2/2006 |
| CN | 1998170 A | 7/2007 |

(Continued)

OTHER PUBLICATIONS

International Search Report in international application No. PCT/CN2009/075998, mailed on Apr. 8, 2010.

(Continued)

*Primary Examiner* — Charles Appiah
*Assistant Examiner* — Matthew Genack
(74) *Attorney, Agent, or Firm* — Oppedahl Patent Law Firm LLC

(57) ABSTRACT

The present invention discloses a method for sending auxiliary detection signaling, comprising: for each base station in a base station group, that is, a first base station, the other base stations in the base station group except the first base station respectively send auxiliary detection signaling at the carrier frequency of the first base station. The technical solution saves both signaling overhead and power and reduces the complexity of a search carried out by an MS.

30 Claims, 11 Drawing Sheets

(56) References Cited

U.S. PATENT DOCUMENTS

| | | |
|---|---|---|
| 2005/0233715 A1 | 10/2005 | Laroia et al. |
| 2007/0058604 A1* | 3/2007 | Lee et al. ............... 370/345 |
| 2009/0042532 A1* | 2/2009 | Bienas et al. ............ 455/403 |
| 2009/0052428 A1* | 2/2009 | Ryu et al. ................ 370/350 |
| 2010/0081448 A1* | 4/2010 | Wong et al. ............. 455/452.1 |

FOREIGN PATENT DOCUMENTS

| | | |
|---|---|---|
| CN | 101252786 A | 8/2008 |
| JP | 2004193950 A | 7/2004 |
| JP | 2007533253 A | 11/2007 |
| JP | 2009542083 A | 11/2009 |
| WO | 2007148911 A1 | 12/2007 |
| WO | 2008064252 A2 | 5/2008 |
| WO | 2008102099 A1 | 8/2008 |
| WO | 2008139901 A1 | 11/2008 |

OTHER PUBLICATIONS

English Translation of the Written Opinion of the International Search Authority in international application No. PCT/CN2009/075998, mailed on Apr. 8, 2010.

* cited by examiner

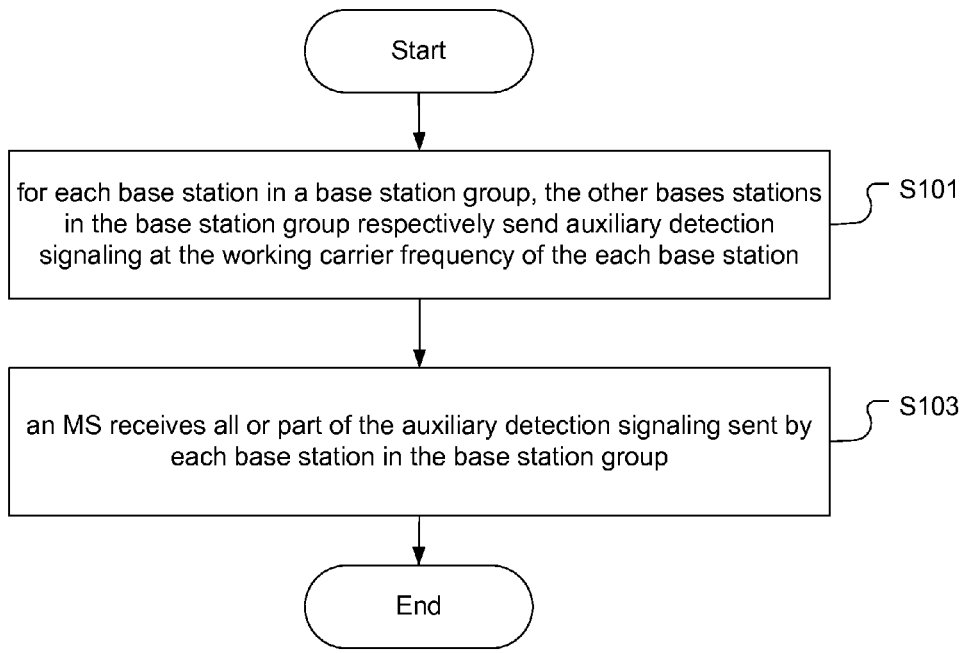
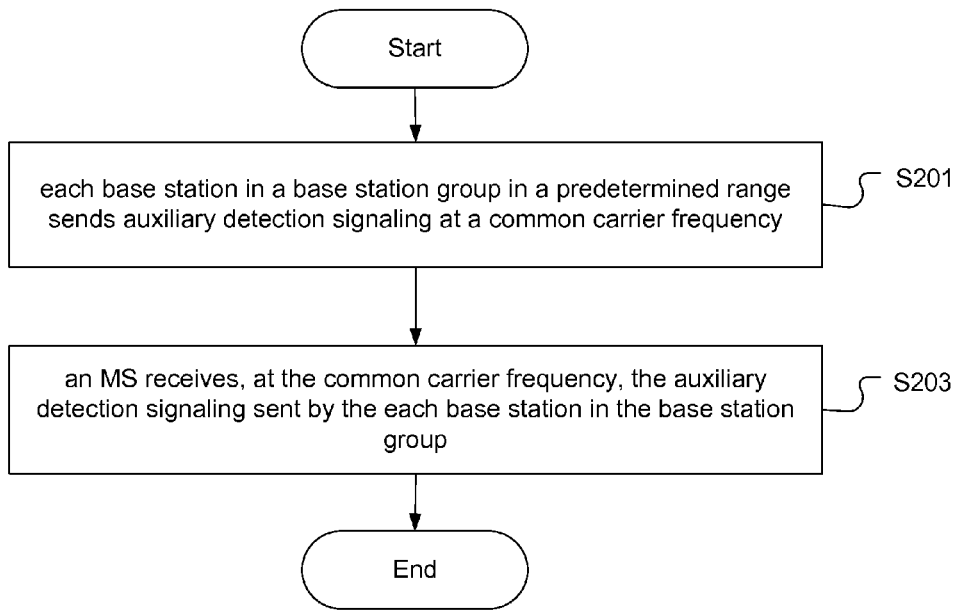

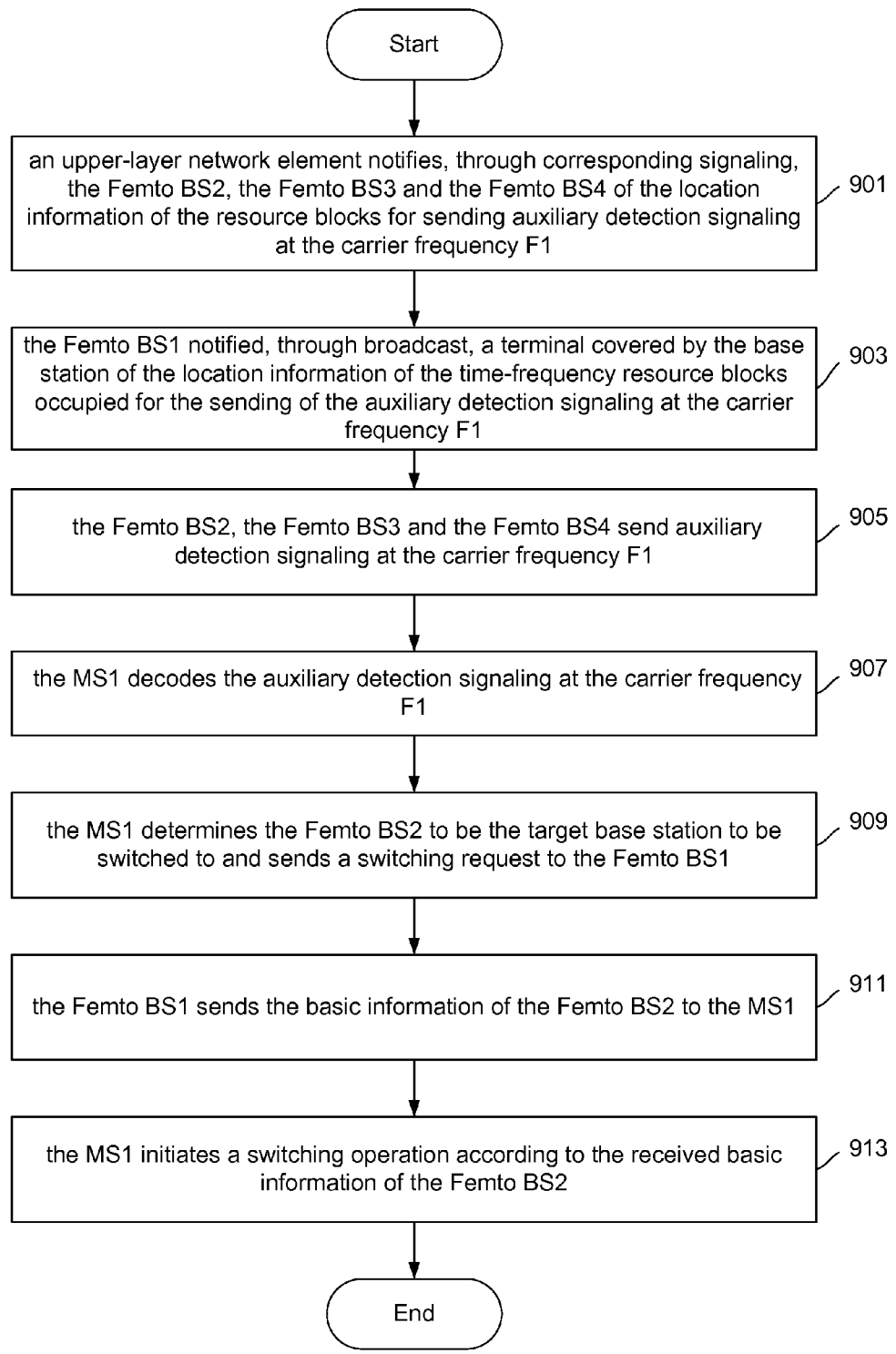

METHOD FOR SENDING AUXILIARY DETECTION SIGNALING

TECHNICAL FIELD

The present invention relates to the technical field of mobile communications, and in particular to a method for sending auxiliary detection signaling in a wireless communication system.

BACKGROUND

In a wireless communication system, a base station refers to a device providing services for a terminal and communicating with the terminal through an uplink and a downlink, wherein the DownLink (DL), which is also called a forward link, refers to a direction from the base station to the terminal, and the UpLink (UL), which is also called a reverse link, refers to a direction from the terminal to the base station. Multiple terminals can send data synchronously to a base station through an uplink or receives is data synchronously from a base station through a downlink.

In a mobile network, the quality of wireless coverage is the key for a terminal to enjoy high-speed data service as well as voice and video service. At present, in order to achieve seamless coverage of a wireless network, the main efforts should focus on realizing coverage over indoor areas and hotspot areas. In order to address the coverage problem above, there have been currently provided two main solutions, in one of which the number and the density of Macro Base Stations (Macro BS) are increased, wherein a Macro BS is also called a Macro Cell, and in another of which a small base station with lower transmit power, such as a Femto Base Station (Femto BS or Femto Cell), a Micro Base Station (Micro BS or Micro Cell) and a Pico Base Station (Pico BS or Pico Cell), is installed indoor, wherein the Femto BS is also called a personal BS.

According to Shannon principle, the current adoption of conventional Macro BSs is approximate to a capacity limit of the use of a frequency spectrum, any increase in the high-power Macro BSs will only result in more radiation pollution but no contribution to indoor coverage, whereas, the use of a small base station such as a Femto BS or a Pico BS can not only perfectly realize coverage over indoor areas and hotspot areas but also increase system capacity significantly on the basis of existing frequency spectrum resources.

A Femto BS can provide services for all users or only for a group of specific authorized users. For the reasons such as signal fading, interference or a higher requirement on Quality of Service (QoS), a Mobile Station (MS) may transfer from an air interface of a base station (called a serving base station) to an air interface of another base station (called a target base station), this process is called switching. If there exists a Macro BS as well as a Femto BS and a Pico BS in a system, a terminal may need to be switched among the Micro BS, the Femto BS and the Pico BS. There have been currently provided two main switching methods: method 1: a Macro BS broadcasts information of a neighboring cell list (the information indicates some basic information related to an available BS nearby the Macro BS), and an MS searches for a BS recorded in the neighboring cell list according to the information of the neighboring cell list and then performs switching, this switching method will cause a high signaling overhead, and additionally, the MS may find, according to the information of the neighboring cell list, a great number of Femto BSs and Pico BSs which may be unsuitable for the MS; and method 2: an MS automatically searches for a Femto BS or Pico BS suitable for switching, as there may be numerous Pico BSs and Macro BSs which may work at different carrier frequencies, this method will increase the searching complexity of the MS and is hardly conducive to power saving.

SUMMARY

The present invention provides methods for transmitting auxiliary detection signaling to address the problem existing in the prior art that a high signaling overhead is caused and a search carried out by an MS is complicated when the MS is switched among a Macro BS, a Femto BS, a Micro BS and a Pico BS.

In one aspect, a method for sending auxiliary detection signaling is provided, in which each base station in a base station group respectively determines itself as a first base station, the method comprises:

for a first base station in the base station group, other base stations in the base station group except the first base station respectively sending auxiliary detection signaling at the carrier frequency of the first base station.

The base station group may comprise all or part of base stations in a predetermined range.

The base stations in the predetermined range may comprise:

one or more base stations, and femto base stations, and/or micro base stations, and/or pico base stations covered by the one or more base stations; or multiple base stations working at all or part of available carrier frequency resources, which comprises femto base stations, micro base stations, pico base stations or macro base stations.

The carrier frequency may comprise one or more carrier frequencies at which the first base station works.

The location of a time-frequency resource, where the auxiliary detection signaling is sent, may be determined in any of the following ways:

configured by a standard default;

determined by the first base station;

determined through a negotiation between the first base station and the other base stations;

determined by an upper-layer network element of base stations in the base station group;

determined through a negotiation between the upper-layer network element and the first base station;

determined through a negotiation among the upper-layer network element, the first base station and the other base stations.

The upper-layer network element may comprise one of: a base station controller, an access serving network, a connection serving network and a gateway of a core network.

After sending the auxiliary detection signaling, the method may further comprise:

sending location information of the time-frequency resource to a terminal by the first base station in a predetermined manner, wherein the predetermined manner is unicasting, multicasting or broadcasting.

Before sending the location information to the terminal by the first base station, the method may further comprise:

sending the location information to the first base station by the upper-layer network element.

The time-frequency resource may be located within a downlink sub-frame or within a transformation gap of an uplink sub-frame and a downlink sub-frame.

The auxiliary detection signaling may be sent in a signaling format agreed by a terminal, and content contained in the auxiliary detection signaling may be that agreed by the terminal.

Content contained in the auxiliary detection signaling sent by one of the other base stations may comprise one of or any combination of: a pilot sequence of the base station, a synchronous channel of the base station, a type of the base station, an index number of the base station, access limitations regulated by the base station on a terminal, indication information indicative of whether or not the base station can provide services, and indication information indicative of whether or not the base station allows access of more terminals.

The limitations may comprise: a type and/or an identifier of a terminal that is allowed to access the base station, and/or an identifier of a terminal group that is allowed to access the base station.

Time-frequency resources occupied by the other base stations to send the auxiliary detection signaling at the carrier frequency of the first base station may be all or partially identical or all different.

The time-frequency resources occupied by the other base stations to send the auxiliary detection signaling at the carrier frequency of the first base station may be identical; and the auxiliary detection signaling sent by each base station is a code is word sequence, all these code word sequences are mutually orthogonal or quasi-orthogonal.

The time-frequency resource blocks occupied by the other base stations to send the auxiliary detection signaling at the carrier frequency of the first base station may be identical; the auxiliary detection signaling sent by each base station is signaling generated by conducting spectrum spreading on predetermined information with a predetermined sequence as spread spectrum codes, wherein predetermined sequences are code word sequences that are mutually orthogonal or quasi-orthogonal.

After sending the auxiliary detection signaling, the method may further comprise:

receiving all or part of the auxiliary detection signaling from the other base stations by a terminal.

After receiving all or part of the auxiliary detection signaling by the terminal, the method may further comprise:

determining a target base station to be switched to by the terminal according to the received auxiliary detection signaling.

After receiving all or part of the auxiliary detection signaling by the terminal, the method may further comprise:

determining, by the terminal, a target base station whose information is required to be acquired according to the received auxiliary detection signaling;

and sending a request to a current serving base station by the terminal to request related information of the target base station.

A method for sending auxiliary detection signaling comprises:

sending auxiliary detection signaling by base stations in a base station group at a common carrier frequency.

The base station group may comprise all or part of base stations in a predetermined range.

The base stations in the predetermined range may comprise:

one or more base stations, and femto base stations, and/or micro base stations, and/or pico base stations covered by the one or more base stations; or multiple base stations working at all or part of available carrier frequency resources, comprising femto base stations, micro base stations, pico base stations or macro base stations.

The common carrier frequency may comprise one or more carrier frequencies at which base stations in the base station group are able to send signaling.

Location information of time-frequency resources, where base stations in the base station group respectively send the auxiliary detection signaling, may be determined in any of the following ways:

configured by a standard default;

determined by base stations sending the auxiliary detection signaling;

determined by an upper-layer network element of the base stations in the base station group;

and determined through a negotiation between the upper-layer network element and the base stations sending the auxiliary detection signaling.

The upper-layer network element may comprise one of: a base station controller, an access serving network, a connection serving network and a gateway of a core network.

After sending the auxiliary detection signaling by the base station, the method may further comprise:

sending information of the common carrier frequency by the base station in a predetermined manner, wherein the predetermined manner is unicasting, multicasting or broadcasting.

Before sending the information of the common carrier frequency by the base station, the method may further comprise:

sending the information of the common carrier frequency by the upper-layer network element to the base station.

The time-frequency resources may be located within a downlink sub-frame or within a transformation gap between an uplink sub-frame and a downlink sub-frame.

The auxiliary detection signaling may be sent in a signaling format agreed by a terminal, and content contained in the auxiliary detection signaling may be that agreed by the terminal.

Content contained in the auxiliary detection signaling may comprise one of or any combination of:

a pilot sequence of the base station;

a synchronization sequence of the base station;

a type of the base station;

an index number of the base station;

access limitations regulated by the base station on a terminal;

indication information indicative of whether or not the base station can provide services; and indication information indicative of whether or not the base station allows access of more terminals.

The limitations may comprise a type and/or an identifier of a terminal that is allowed to access the base station, and/or an identifier of a terminal group that is allowed to access the base station.

Time-frequency resources occupied by the base stations in the base station group to send the auxiliary detection signaling at the same common carrier frequency may be all or partially identical or all different.

The time-frequency resources occupied by the base stations in the base station group to send the auxiliary detection signaling at the same common carrier frequency may be identical; and the auxiliary detection signaling sent by each base station may be a code word sequence, all these code word sequences are mutually orthogonal or quasi-orthogonal.

The time-frequency resources occupied by the base stations in the base station group to send the auxiliary detection signaling at the same common carrier frequency may be identical; the auxiliary detection signaling sent by each base station may be signaling generated by conducting spectrum spreading on predetermined information with taking predetermined sequences as spread spectrum codes, wherein the predetermined sequences are code word sequences that are mutually orthogonal or quasi-orthogonal.

After sending the auxiliary detection signaling, the method may further comprise:

receiving the auxiliary detection signaling at the common carrier frequency by a terminal covered by the base station group.

After receiving the auxiliary detection signaling at the common carrier frequency by the terminal, the method may further comprise:

determining a target base station to be switched to by the terminal according to the received auxiliary detection signaling.

After receiving the auxiliary detection signaling at the common carrier frequency by the terminal, the method may further comprise:

determining, by the terminal, a target base station whose information is required to be acquired according to the received auxiliary detection signaling, and sending a request by the terminal to a current serving base station to request related information of the target base station.

Through at least one of the solutions above, each base station in a wireless communication network can send auxiliary detection signaling at working carrier frequencies of the other base stations in the same wireless communication network or a common carrier frequency so that an MS can obtain the auxiliary detection signaling sent by the each base station only by searching for one carrier frequency, and consequentially, a channel estimation can be performed on the each base station, and switching can be conducted according to the result of the channel estimation. The present invention addresses the problem existing in the prior art that a signaling overhead is high and a search carried out by an MS is complicated during switching and therefore lowers the signaling overhead, reduces the searching complexity of an MS and facilitates power saving.

Additional features and advantages of the invention will be set forth in the description below, and in part will be apparent from the description, or may be learned by implementation of the invention. The object and other advantages of the invention can be realized by and obtained from the structures particularly illustrated in the specification, claims and the accompanying drawings.

BRIEF DESCRIPTION OF THE DRAWINGS

FIG. 1 is a flow chart of a method for transmitting auxiliary detection signaling according to an embodiment of the present invention;

FIG. 2 is a flow chart of another method for transmitting auxiliary detection signaling according to an embodiment of the present invention;

FIG. 19 is a flow chart of a method for sending and receiving auxiliary detection signaling according to Embodiment 14.

DETAILED DESCRIPTION

Figure 3:
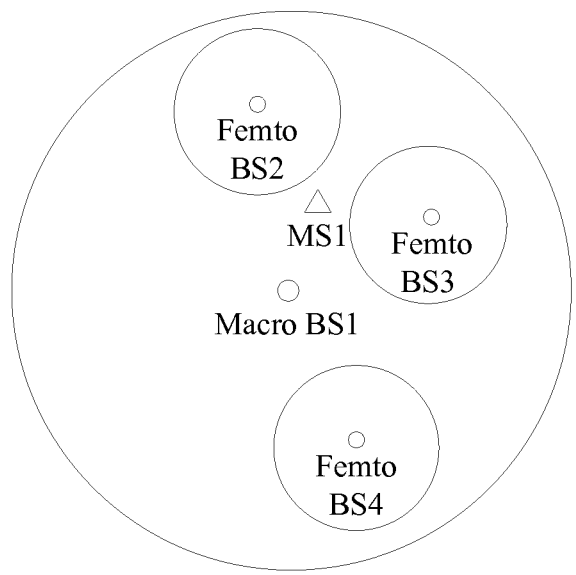
FIG. 3 is a schematic diagram illustrating distribution of base stations and a terminal in a wireless communication system according to an embodiment of the present invention.

Aiming at the problem existing in the prior art that a signaling overhead is high and a search carried out by an MS is relatively complicated during switching in a wireless communication system, solutions for sending auxiliary detection signaling are provided in embodiments of the present invention, which can be realized in either of the following two ways:

(1) for each base station in a base station group in a predetermined range, the other bases stations in the base station group respectively send auxiliary detection is signaling at a working carrier frequency of the each base station, and an MS can obtain the auxiliary detection signaling sent by each base station in the base station group at the working carrier frequency of the each base station to obtain related information of each base station; and (2) each base station in a base station group in a predetermined range sends auxiliary detection signaling at one or more common carrier frequencies and an MS performs scanning at the one or more common carrier frequencies to obtain the auxiliary detection signaling sent by each base station in the base station group so as to obtain related information of each base station.

In the embodiments of the present invention, the predetermined range may be set as needed, for instance, the predetermined range may include one base station and all Femto BSs, Pico BSs and Micro BSs covered by the base station, or all base stations (including Femto BSs, Pico BSs and Micro BSs) working at currently available carrier frequency resources.

The embodiments of the present invention and the features thereof can be combined with each other if no conflict is caused.

The preferred embodiments of the invention are illustrated below in conjunction with accompanying drawings, and it should be appreciated that the preferred embodiments herein are only for illustrating and explaining the invention but not for limiting the invention.

For a better understanding of the present invention, two realization modes of the solutions provided in the embodiments of the present invention for sending and receiving auxiliary detection signaling are explained below.

In accordance with an embodiment of the present invention, there is provided a method for transmitting auxiliary detection signaling.

FIG. 1 is a flow chart of a method for transmitting auxiliary detection signaling according to an embodiment of the present invention. As shown in FIG. 1, the method for transmitting auxiliary detection signaling according to an embodiment of the present invention mainly comprises the following processing (Step S101-Step S103):

Step S101: for each base station in a base station group, other bases stations in the base station group respectively send auxiliary detection signaling at a carrier frequency of the each base station, wherein the base station group comprises all or part of base stations in a predetermined range; and Step S103: an MS receives all or part of the auxiliary detection signaling sent by each base station in the base station group.

Each processing above is described below in detail:

For the sake of a convenient description, it is assumed in the description below that there are four base stations, which are A, B, C and D respectively, in a predetermined range and the base station group comprises all the base stations in the predetermined range in the embodiment of the present invention, wherein a working carrier frequency of the base station A is F1, a working carrier frequency of the base station B is F2, a working carrier frequency of the base station C is F3, and a working carrier frequency of the base station D is F4.

(I). Step S101

In a specific implementation process, the base station group consisting of the four base stations A, B, C and D is taken as an example. The base station B, C and D respectively send auxiliary detection signaling at the working carrier frequency F1 of the base station A; the base station A, C and D respectively send auxiliary detection signaling at the working carrier frequency F2 of the base station B; the base station A, B and D respectively send auxiliary detection signaling at the working carrier frequency F3 of the base station C; and the base station A, B and C respectively send auxiliary detection signaling at the working carrier frequency F4 of the base station D.

In a specific implementation process, the base stations in the predetermined range refer to those working at currently-available carrier frequency resources, including a Femto BS, a Pico BS, a Macro BS or a Micro BS.

In a specific implementation process, the location of a time-frequency resource block where a base station sends auxiliary detection signaling is determined in the following ways (but not limited to the ways illustrated herein):

(1) determined by a current base station: taking the predetermined range including the four base stations A, B, C and D as an example, for the base station A, the location of a time-frequency resource block where the base stations B, C and D send auxiliary detection signaling is determined by the base station A;

(2) determined by the current base station and the base station sending the auxiliary detection signaling: taking the predetermined range including the four base stations A, B, C and D as an example, for the base station A, the location of a time-frequency resource block where the base stations B, C and D send auxiliary detection signaling at the carrier frequency F1 of the base station A may be determined through a negotiation between the base station A and the base stations B, C and D;

(3) determined by an upper-layer network element of the base stations in the base station group;

in a specific implementation process, the upper-layer network element comprises but is not limited to: a base station controller, an access serving network, a connection serving network and a gateway of a core network;

(4) determined through a negotiation between the upper-layer network element and the current base station: taking the predetermined range including the four base stations A, B, C and D as an example, for the base station A, the location of a time-frequency resource block where the base stations B, C and D send auxiliary detection signaling is determined through a negotiation between the upper-layer network element and the base station A.

(5) determined through a negotiation among the upper-layer network element, the current base station and the base station sending the auxiliary detection signaling: taking the predetermined range including the four base stations A, B, C and D as an example, for the base station A, the location of a time-frequency resource block where the base stations B, C and D send auxiliary detection signaling at the carrier frequency F1 of the base station A is determined through a negotiation among the upper-layer network element, the base station A, and the base stations B, C and D; and (6) configured by a standard default.

In a specific implementation process, the location of a time-frequency resource block where each base station sends auxiliary detection signaling may also be determined according to a preset standard.

In a specific implementation process. If the location of the time-frequency resource block is determined in the absence of a current serving base station of an MS, then the serving base station may send a request to another base station to obtain location information of the time-frequency resource block and then sends the obtained location information to the MS. Or, after determining the location of the time-frequency resource block, the upper-layer network element sends location information to the serving base station of the MS, then the serving base station sends the location information to the MS so that the MS can scan, at a common carrier frequency, the auxiliary detection signaling sent by the base stations in the base station group at the common carrier frequency.

In a specific implementation process, the time-frequency resource block where auxiliary detection signaling is sent may be located within a downlink sub-frame or within a transformation gap between an uplink sub-frame and a downlink sub-frame.

Moreover, the auxiliary detection signaling sent by each base station in the base station group may be sent in a signaling format agreed by the MS, and the content contained in the auxiliary detection signaling may be that agreed by the MS.

Additionally, the auxiliary detection signaling sent by each base station in the base station group may contain specific content, which may specifically include one of or any combinations of:

(1) a pilot sequence of a base station sending auxiliary detection signaling: specifically, taking the base station group consisting of the base stations A, B, C and D as an example, for the base station A, the content contained in the auxiliary detection signaling sent by the base station B at the carrier frequency F1 of the base station A comprises a pilot sequence of the base station B, the content contained in the auxiliary detection signaling sent by the base station C at the carrier frequency F1 of the base station A comprises a pilot sequence of the base station C, and similarly, the content contained in the auxiliary detection signaling sent by the base station D at the carrier frequency F1 of the base station A comprises a pilot sequence of the base station D;

(2) the type (Femto BS, Pico BS, Macro BS or Micro BS) of the base station sending auxiliary detection signaling: specifically, taking the base station group consisting of the base stations A, B, C and D as an example, for the base station A, the content contained in the auxiliary detection signaling sent by the base station B at the carrier frequency F1 of the base station A comprises the type of the base station B, the content contained in the auxiliary detection signaling sent by the base station C at the carrier frequency F1 of the base station A comprises the type of the base station C, and similarly, the content contained in the auxiliary detection signaling sent by the base station D at the carrier frequency F1 of the base station A comprises the type of the base station D;

specifically, the type of a base station indicates that the base station is a Femto BS, a Pico BS, a Macro BS or a Micro BS;

(3) an index number (including a Cell ID or BS ID of the base station) of the base station sending auxiliary detection signaling: specifically, taking the base station group consisting of the base stations A, B, C and D as an example, for the base station A, the content contained in the auxiliary detection signaling sent by B at the carrier frequency F1 of the base station A comprises a Cell ID or BS ID of the base station B, the content contained in the auxiliary detection signaling sent by the base station C at the carrier is frequency F1 of the base station A comprises a Cell ID or BS ID of the base station C, and similarly, the content contained in the auxiliary detection signaling sent by the base station D at the carrier frequency F1 of the base station A comprises a Cell ID or BS ID of the base station D;

(4) limitations regulated by the base station sending auxiliary detection signaling on an accessed MS: specifically, the limitations may comprise the type of an MS that is allowed to access the base station (that is, whether the base station allows access of an MS of a specific type), and/or an identifier of an MS that is allowed to access the base station, and/or an identifier of a terminal group that is allowed to access the base station;

(5) indication information indicative of whether or not the base station sending auxiliary detection signaling is able to provide services; and (6) indication information indicative of whether or not the base station allows access of more terminals.

In the case that the auxiliary detection signaling contains the content above, time-frequency resources occupied by the base stations in the predetermined range to send auxiliary detection signaling at the carrier frequency of the current base station may be all or partially identical or all different; and in the case that time-frequency resources occupied by multiple base stations to send auxiliary detection signaling are identical, in order to assist the MS in distinguishing the auxiliary detection signaling sent by different base stations, the auxiliary detection signaling sent by the base stations on the time-frequency resources should meet at least one of the following conditions:

(1) the auxiliary detection signaling sent by each base station on the time-frequency resources is a code word sequence, all these code word sequences are mutually orthogonal or quasi-orthogonal;

taking the above predetermined range including the base stations A, B, C and D as an example, for the base station A, the auxiliary detection signaling sent by the base stations B, C and D at the carrier frequency F1 of the base station A is code word sequences that are mutually orthogonal or quasi-orthogonal; and (2) the auxiliary detection signaling sent by each base station at the time-frequency resources is signaling generated by conducting spectrum spreading on predetermined information with a predetermined sequence as spread spectrum codes, wherein predetermined sequences are code word sequences that are mutually orthogonal or quasi-orthogonal, wherein the predetermined information refers to the content that is is needed to be contained in the auxiliary detection signaling, such as the type or an index number of a base station;

(II). Step S103

In a specific implementation process, when the MS obtains, from the current serving base station, location information of the time-frequency resource block where each base station in the base station group sends auxiliary detection signaling, the MS perform scanning according to the location information to decode the auxiliary detection signaling sent by the each base station at the common carrier frequency.

If the MS have not received the above location information, the MS would scan at the working carrier frequency until the auxiliary detection signaling sent by each base station at the carrier frequency is scanned.

After obtaining the auxiliary detection signaling sent by each base station in the base station group at the working carrier frequency, the MS determines whether or not to perform switching according to the obtained auxiliary detection signaling sent by each base station, determines a target base station to be switched to when switching is needed, and then sends a request to the current serving base station to obtain related information of the target base station to perform the switching. Moreover, according to the obtained auxiliary detection signaling sent by each base station, the MS determines whether or not to obtain related information of one of the base stations, and sends a request to the current serving base station, when determining there is a need to obtain related information of a base station, to request to obtain the related information of the base station.

The method for transmitting auxiliary detection signaling provided in this embodiment of the present invention enables an MS to perform a search only at the working carrier frequency, thus reducing the complexity of the search.

In accordance with an embodiment of the present invention, another method for transmitting auxiliary detection signaling is provided.

FIG. 2 is a flow chart of another method for transmitting auxiliary detection signaling according to an embodiment of the present invention as shown in FIG. 2, the method mainly comprises the following steps (Step S201-Step S203):

Step S201: each base station in a base station group in a predetermined range sends auxiliary detection signaling at a common carrier frequency; and Step S203: an MS receives, at the common carrier frequency, the auxiliary detection signaling sent by each base station in the base station group.

The steps above are described below in detail:

(I). Step S201

In this embodiment, the common carrier frequency may be a carrier frequency resource at which all the base stations (a Macro BS and/or a Femto BS and/or a Pica BS and/or a Micro BS) in the current wireless communication system can send signaling, or a carrier frequency resource at which a group of base stations (a Macro BS and/or a Femto BS and/or a Pico BS and/or a Micro BS) can all send signaling.

In a specific implementation process, taking a base station group consisting of base stations A, B, C and D as an example, the base stations A, B, C and D respectively send auxiliary detection signaling at one or more common carrier frequencies; moreover, if the base stations A, B, C and D send auxiliary detection signaling at multiple common carrier frequencies (for example, two common carrier frequencies F1 and F2), different base stations may use different common carrier frequencies (for instance, base stations A and B use F1 while base stations C and D use F2).

In addition, the base stations in the predetermined range refer to base stations working at currently-available carrier frequency resources, including a Femto BS, a Pico BS, a Macro BS or a Micro BS.

In a specific implementation process, the location of a time-frequency resource block where a base station sends auxiliary detection signaling is determined in the following ways (but not limited to the ways illustrated herein):

(1) determined by the base station sending auxiliary detection signaling: taking a predetermined range including the four base stations A, B, C and D as an example, the location of a time-frequency resource block where the base station A sends auxiliary detection signaling can be determined by the base station A or through a negotiation among the base stations A, B, C and D;

(2) determined by an upper-layer network element of the base stations in the predetermined range;

in a specific implementation process, the upper-layer network element comprises but is not limited to: a base station controller, an access serving network, a connection serving network and a gateway of a core network;

(3) determined through a negotiation between the upper-layer network element and the base station sending auxiliary detection signaling: taking the predetermined range including the four base stations A, B, C and D as an example, the location of a time-frequency resource block where the base station A sends auxiliary detection is signaling can be determined through a negotiation between the base station A and the upper-layer network element or through a negotiation between the upper-layer network element and the base stations A, B, C and D; and (4) configured by a standard default.

In a specific implementation process, if the determination of the location of the time-frequent resource block involves a current serving base station of an MS, after determining the location of the time-frequency resource block, the serving base station sends Information of the common carrier frequency to the MS through unicast, multicast or broadcast, the MS performs scanning at the common carrier frequency according to the information to obtain the auxiliary detection signaling sent by the base stations in the base station group at the common carrier frequency.

If the location of the time-frequency resource block is determined in the absence of the current serving base station of the MS, the serving base station may send a request to other base stations to obtain information of the common carrier frequency and then send the information to the MS. Or, after determining the location of the time-frequency resource block, the upper-layer network element sends information of the common carrier frequency to the serving base station of the MS, then the serving base station sends the information of the common carrier frequency to the MS so that the MS can scan, at the common carrier frequency, the auxiliary detection signaling sent by the base stations in the base station group at the common carrier frequency.

In a specific implementation process, the time-frequency resource block where auxiliary detection signaling is sent may be located within a downlink sub-frame or within a transformation gap between an uplink sub-frame and a downlink sub-frame.

Moreover, the auxiliary detection signaling sent by each base station in the base station group may be sent in a signaling format agreed by the MS, and the content contained in the auxiliary detection signaling may be that agreed by the MS.

Additionally, the auxiliary detection signaling sent by each base station in the base station group may contain specific content, which may specifically include one of or any combinations of:

(1) a pilot sequence of a base station sending auxiliary detection signaling;

(2) the type (Femto BS, Pico BS, Macro BS or Micro BS) of the base station sending auxiliary detection signaling;

(3) an index number (a Cell ID or BS ID of the base station) of the base station sending auxiliary detection signaling;

(4) limitations regulated by the base station sending auxiliary detection signaling on an accessed MS, specifically, the limitations may comprise the type of the MS that is allowed to access the base station (that is, whether the base station allows access of an MS of a specific type), and/or the identifier of an MS that is allowed to access the base station, and/or the number of MSs that are allowed to access the base station.

(5) indication information indicative of whether or not the base station sending auxiliary detection signaling can provide services; and (6) indication information indicative of whether or not the base station allows access of more terminals.

In the case that the auxiliary detection signaling contains the content above, time-frequency resources occupied by the base stations in the base station group to send auxiliary detection signaling at the same common carrier frequency may be all or partially identical or all different; when multiple base stations send auxiliary detection signaling at the same time-frequency resource of the same common carrier frequency, in order to assist the MS in distinguishing the auxiliary detection signaling sent by different base stations, the auxiliary detection signaling sent by the base stations at the same time-frequency resource of the common carrier frequency should meet at least one of the following conditions:

(1) the auxiliary detection signaling sent by the base stations on the same time-frequency resource of the same common carrier frequency are code word sequences that are mutually orthogonal or quasi-orthogonal;

taking the base station group consisting of the base stations A, B, C and D as an example, if the four base stations send auxiliary detection signaling within the same time slot of the same common carrier frequency, the auxiliary detection signaling sent by the base stations A, B, C and D are code word sequences that are mutually orthogonal or quasi-orthogonal; and (2) the auxiliary detection signaling sent by the base stations on the same time-frequency resource of the same common carrier frequency is signaling generated by conducting spectrum spreading on predetermined information with predetermined sequences as spread spectrum codes, wherein the predetermined sequences are code word sequences that are mutually orthogonal or quasi-orthogonal, and the predetermined information refers to the content needed to be contained in the auxiliary detection signaling, such as the type or an index number of a base station.

(II) Step S203

In a specific implementation process, when the MS obtains, from the current serving base station. Information of the common carrier frequency at which each base station in the base station group sends auxiliary detection signaling, the MS perform scanning at one or more carrier frequencies according to the information to decode the auxiliary detection signaling sent by the each base station at the common carrier frequency.

After obtaining the auxiliary detection signaling sent by each base station in the base station group at the common carrier frequency, the MS determines whether or not to perform switching according to the obtained auxiliary detection signaling of the each base station, determines a target base station to be switched to when switching is needed, and then sends a request to the current serving base station to obtain related information of the target base station to perform the switching; moreover, according to the obtained auxiliary detection signaling of the each base station, the MS can determine whether or not to obtain related information of one of the base stations and send a request to the current serving base station, when determining there is a need to obtain related information of a base station, to request to obtain the related information of the base station.

The method for transmitting auxiliary detection signaling provided in this embodiment enables an MS to perform a search only at a common carrier frequency, thus reducing the complexity of the search and decreasing the number of signaling used in switching.

For better understanding of the specific implementation modes of the technical solutions provided in the embodiments of the present invention, the technical solutions provided in the embodiments of the present invention are explained below by reference to specific embodiments.

Embodiment 1

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3.

In the wireless communication system, the Macro BS1 sends auxiliary detection signaling on appropriate resource blocks of the carrier frequencies F2, F3 and F4, the Femto BS2 sends auxiliary detection signaling on appropriate resource blocks of the carrier frequencies F1, F3 and F4, the Femto BS3 sends auxiliary detection signaling on is appropriate resource blocks of the carrier frequencies F1, F2 and F4, and the Femto BS4 sends auxiliary detection signaling on appropriate resource blocks of the carrier frequencies F1, F2 and F3.

Figure 4:
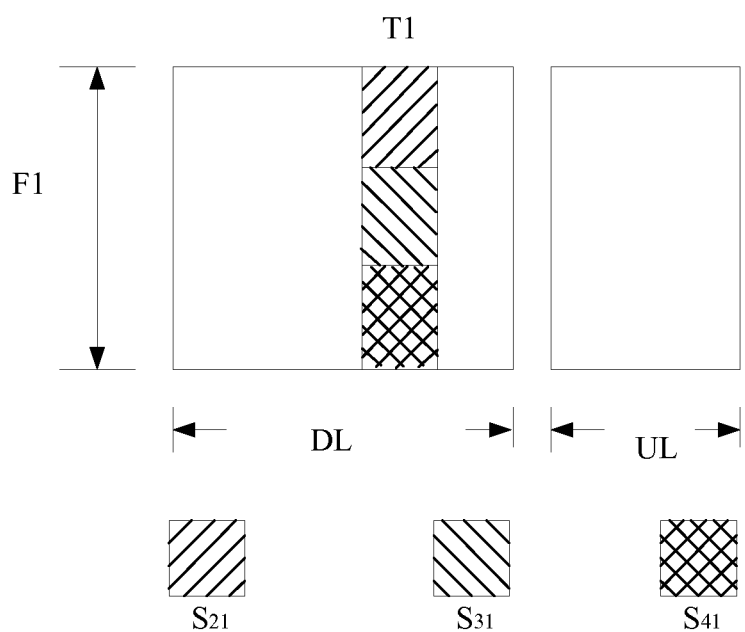
FIG. 4 is a schematic diagram illustrating a method for sending auxiliary detection signaling according to Embodiment 1.

In this embodiment, taking the carrier frequency F1 of the Macro BS1 as an example, the Macro BS1 notifies, through corresponding signaling, the Femto BS2, the Femto BS3 and the Femto BS4 of location information of the resource blocks for sending auxiliary detection signaling at F1. As shown in FIG. 4, S21, S31 and S41, which respectively represent the auxiliary detection signaling sent by the Femto BS2, the Femto BS3 and the Femto BS4 at F1, are three groups of pilot sequences that are mutually orthogonal and occupy the same time slot T1.

For the Femto BS2, other base stations send auxiliary detection signaling in a time slot T2; for the Femto BS3, other base stations send auxiliary detection signaling in a time slot T3 on the Femto BS3; and for the Femto BS4, other base stations send auxiliary detection signaling in a time slot T4; wherein T1, T2, T3 and T4 may be the same or different.

In this embodiment, the Macro BS1 notifies, through corresponding signaling, the MS1 to scan the time slot T1 at the carrier frequency F1, decode the auxiliary detection signaling, perform a channel estimation according to pilot information in the auxiliary detection signaling, and evaluate whether or not the channel quality of the Femto BS2, the Femto BS3 and the Femto BS4 is suitable for switching. In this embodiment, when the MS1 determines the Femto BS2 to be the target base station to be switched to by decoding the auxiliary detection signaling S21, S31 and S41, the MS1 can obtain basic information of the Femto BS2 from the current serving base station Macro BS1 and then get ready to perform a switching operation, or the MS1 can directly scan the carrier frequency F2 of the Femto BS2 to obtain basic information of the Femto BS2 to initiate a switching operation.

Embodiment 2

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3.

In this embodiment, the Macro BS1 sends auxiliary detection signaling on appropriate resource blocks of the carrier frequencies F2, F3 and F4, the Femto BS2 sends auxiliary detection signaling on appropriate resource blocks of the carrier is frequencies F1, F3 and F4, the Femto BS3 sends auxiliary detection signaling on appropriate resource blocks of the carrier frequencies F1, F2 and F4, and the Femto BS4 sends auxiliary detection signaling on appropriate resource blocks of the carrier frequencies F1, F2 and F3.

Figure 5:
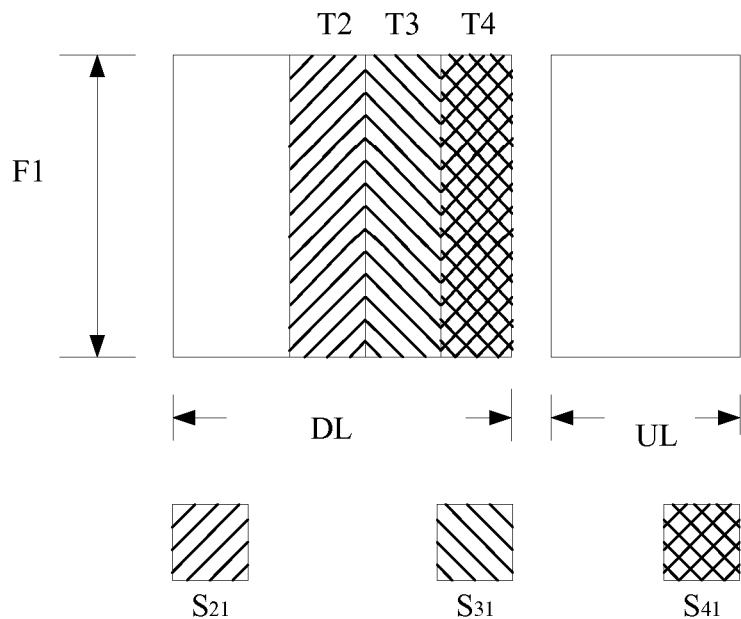
FIG. 5 is a schematic diagram illustrating a method for sending auxiliary detection signaling according to Embodiment 2.

In this embodiment, taking the carrier frequency F1 of the Macro BS1 as an example, the Macro BS1 notifies, through corresponding signaling, the Femto BS2, the Femto BS3 and the Femto BS4 of location information of the resource blocks for sending auxiliary detection signaling at the carrier frequency F1. As shown in FIG. 5, S21, S31 and S41, which respectively represent the auxiliary detection signaling sent by the Femto BS2, the Femto BS3 and the Femto BS4 at the carrier frequency F1, are three groups of pilot sequences that occupy different time slots T2, T3 and T4, respectively.

Time slot resources occupied by each base station to send the auxiliary detection signaling at the carrier frequencies of other base stations may be the same or different.

In this embodiment, the Macro BS1 notifies, through corresponding signaling, the MS1 to scan the time slots T2, T3 and T4 at the carrier frequency F1, decode the auxiliary detection signaling, perform a channel estimation according to pilot information in the auxiliary detection signaling, and evaluate whether or not the channel quality of the Femto BS2, the Femto BS3 and the Femto BS4 is suitable for a switching. In this embodiment, when the MS1 determines the Femto BS2 to be the target base station to be switched to by decoding the auxiliary detection signaling S21, S31 and S41, the MS1 can obtain basic information of the Femto BS2 from the current serving base station Macro BS1 and get ready to perform a switching operation, or the MS1 can directly scan the carrier frequency F2 of the Femto BS2 to obtain basic information of the Femto BS2 to initiate a switching operation.

Embodiment 3

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3.

In this embodiment, the Macro BS1 sends auxiliary detection signaling on appropriate resource blocks of the carrier frequencies F2, F3 and F4, the Femto BS2 sends auxiliary detection signaling on appropriate resource blocks of the carrier frequencies F1, F3 and F4, the Femto BS3 sends auxiliary detection signaling on is appropriate resource blocks of the carrier frequencies F1, F2 and F4, and the Femto BS4 sends auxiliary detection signaling on appropriate resource blocks of the carrier frequencies F1, F2 and F3.

Figure 6:
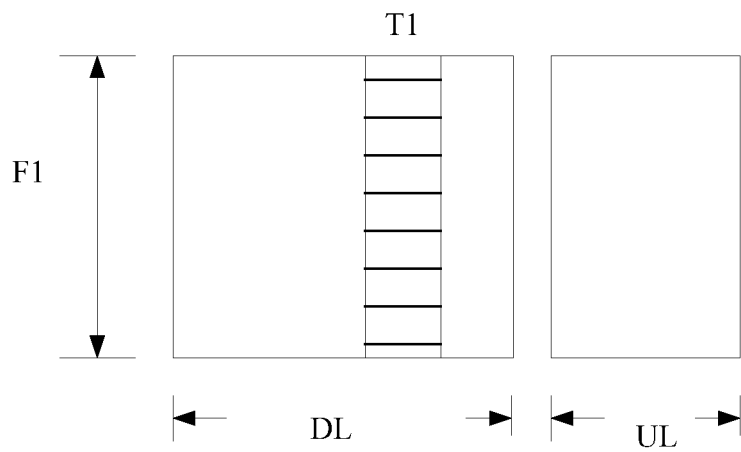
FIG. 6 is a schematic diagram illustrating a method for sending auxiliary detection signaling according to Embodiment 3.

In this embodiment, taking the carrier frequency F1 of the Macro BS1 as an example, the Macro BS1 notifies, through corresponding signaling, the Femto BS2, the Femto BS3 and the Femto BS4 of location information of the resource blocks for sending auxiliary detection signaling at the carrier frequency F1. As shown in FIG. 6, S21, S31 and S41 respectively represent the auxiliary detection signaling sent by the Femto BS2, the Femto BS3 and the Femto BS4 at the carrier frequency F1, are three code word sequences in a predetermined group of code word sequences predetermined that are mutually orthogonal or quasi-orthogonal and occupy the same time slot T1.

For the Femto BS2, other base stations send auxiliary detection signaling in a time slot T2; for the Femto BS3, other base stations send auxiliary detection signaling in a time slot T3; and for the Femto BS4, other base stations send auxiliary detection signaling in a time slot T4; wherein T1, T2, T3 and T4 may be the same or different.

In this embodiment, the Macro BS1 notifies, through corresponding signaling, the MS1 to scan the time slot T1 at the carrier frequency F1, perform a channel estimation by decoding the auxiliary detection signaling, and evaluate whether or not the channel quality of the Femto BS2, the Femto BS3 and the Femto BS4 is suitable for a switching. In this embodiment, when the MS1 determines the Femto BS2 to be the target base station to be switched to by decoding the auxiliary detection signaling S21, S31 and S41, the MS1 can obtain basic information of the Femto BS2 from the current serving base station Macro BS1 and get ready to perform a switching operation, or the MS1 can directly scan the carrier frequency F2 of the Femto BS2 to obtain basic information of the Femto BS2 to initiate a switching operation.

Embodiment 4

Figure 7:
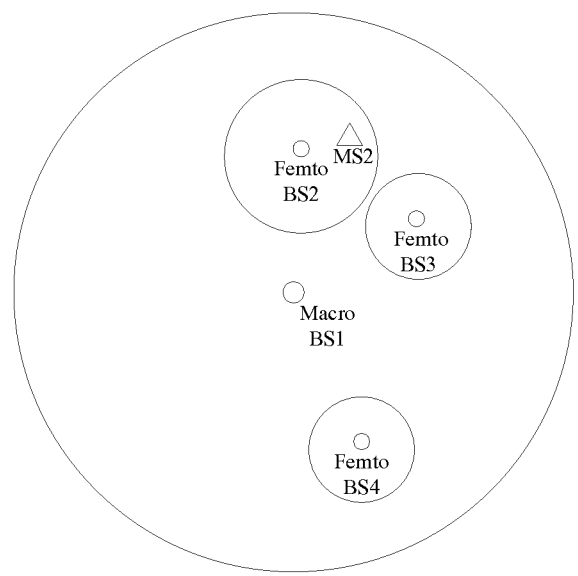
FIG. 7 is a schematic diagram illustrating another distribution of base stations and a terminal in a wireless communication system according to an embodiment of the present invention.

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS2 is the Femto BS2, as shown in FIG. 7.

In this embodiment, each base station sends auxiliary detection signaling on appropriate resource blocks of carrier frequencies of base stations described in a neighboring cell list of the base station.

It is assumed in this embodiment that the Femto BS2, the Femto BS3 and the Femto BS4 are included in a neighboring cell list of the Macro BS1, the Macro BS1 and the Femto BS3 are included in a neighboring cell list of the Femto BS2, the Macro BS1 and the Femto BS2 are included in a neighboring cell list of the Femto BS3, and the Macro BS1 is included in a neighboring cell list of the Femto BS4, then the Macro BS1 sends auxiliary detection signaling on appropriate resource blocks of the carrier frequencies F2, F3 and F4, the Femto BS2 sends auxiliary detection signaling on appropriate resource blocks of the carrier frequencies F1 and F3, the Femto BS3 sends auxiliary detection signaling on appropriate resource blocks of the carrier frequencies F1 and F2, and the Femto BS4 sends auxiliary detection signaling on appropriate resource blocks of the carrier frequency F1.

Figure 8:
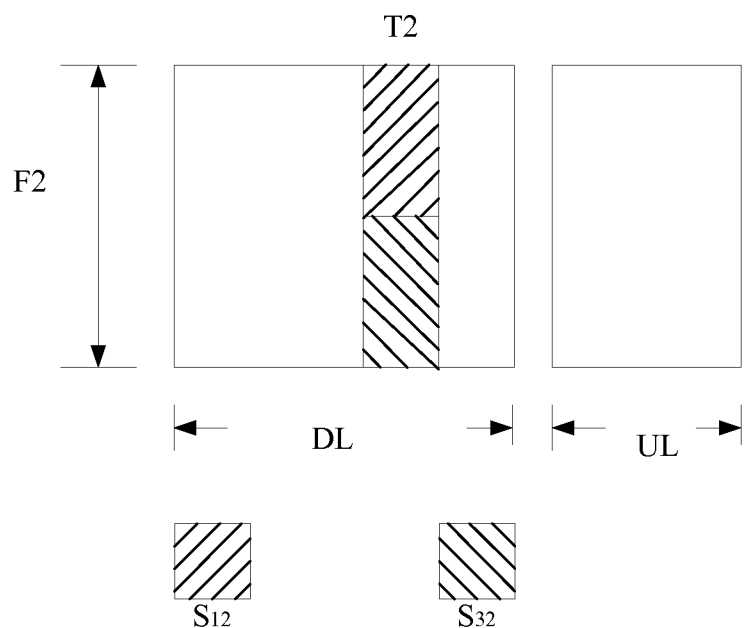
FIG. 8 is a schematic diagram illustrating a method for sending auxiliary detection signaling according to Embodiment 4.

In this embodiment, taking the carrier frequency F2 of the Femto BS2 as an example, the Femto BS2 notifies, through corresponding signaling, the Macro BS1 and Femto BS3 of location information of the resource blocks for sending auxiliary detection signaling at the carrier frequency F2. As shown in FIG. 8, S12 and S32, which respectively represent the auxiliary detection signaling sent by the Macro BS1 and Femto BS3 at the carrier frequency F2, are two groups of pilot sequences that are mutual orthogonal and occupy the same time slot T2.

For the Macro BS1, other base stations send auxiliary detection signaling in a time slot T1; for the Femto BS3, other base stations send auxiliary detection signaling in a time slot T3; and for the Femto BS4, other base stations send auxiliary detection signaling in a time slot T4; wherein T1, T2, T3 and T4 may be the same or different.

In this embodiment, the Femto BS2 notifies, through corresponding signaling, the MS2 to scan the time slot T2 at the carrier frequency F2, decode the auxiliary detection signaling, perform a channel estimation according to pilot information, and evaluate whether or not the channel quality of the Macro BS1 and Femto BS3 is suitable for a switching. In this embodiment, when the MS2 determines the Macro BS1 to be the target base station to be switched to by decoding the auxiliary detection signaling S12 and S32, the MS2 can obtain basic information of the Macro BS1 from the current serving base station Femto BS2 and get ready to perform a switching operation, or the MS2 can directly scan the carrier frequency F1 of the Macro BS1 to obtain basic information of the Macro BS1 to initiate a switching operation.

Embodiment 5

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS2 is the Femto BS2, as shown in FIG. 7.

In this embodiment, each base station sends auxiliary detection signaling on appropriate resource block of carrier frequencies of base stations described in a neighboring cell list of the each base station.

It is assumed in this embodiment that the Femto BS2, the Femto BS3 and the Femto BS4 are included in a neighboring cell list of the Macro BS1, the Macro BS1 and the Femto BS3 are included in a neighboring cell list of the Femto BS2, the Macro BS1 and the Femto BS2 are included in a neighboring cell list of the Femto BS3, and the Macro BS1 is included in a neighboring cell list of the Femto BS4, then the Macro BS1 sends auxiliary detection signaling on appropriate resource blocks of the carrier frequencies F2, F3 and F4, the Femto BS2 sends auxiliary detection signaling on appropriate resource blocks of the carrier frequencies F1 and F3, the Femto BS3 sends auxiliary detection signaling on appropriate resource blocks of the carrier frequencies F1 and F2, and the Femto BS4 sends auxiliary detection signaling on appropriate resource blocks of the carrier frequency F1.

Figure 9:
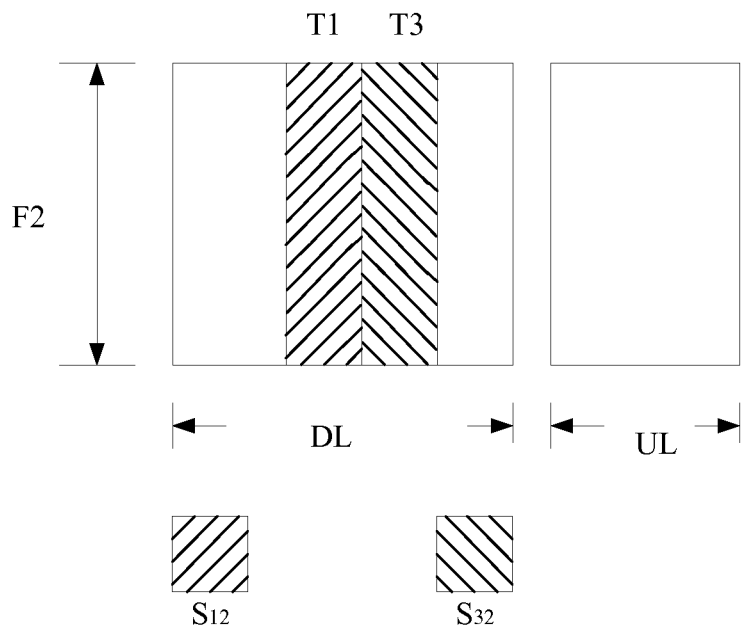
FIG. 9 is a schematic diagram illustrating a method for sending auxiliary detection signaling according to Embodiment 5.

In this embodiment, taking the carrier frequency F2 of the Femto BS2 as an example, the Femto BS2 notifies, through corresponding signaling, the Macro BS1 and the Femto BS3 of location information of the resource blocks for sending auxiliary detection signaling at the carrier frequency F2. As shown in FIG. 9, S12 and S32, which respectively represent the auxiliary detection signaling sent by the Macro BS1 and Femto BS3 at the carrier frequency F2, are two groups of pilot sequences that occupy different time slots T1 and T3, respectively.

Time slot resources occupied by each base station to send the auxiliary detection signaling at the carrier frequencies of the base stations described in the neighboring cell list of the each base station may be the same or different.

In this embodiment, the Femto BS2 notifies, through corresponding signaling, the MS2 to scan the time slots T1 and T3 at the carrier frequency F2, decode the auxiliary detection signaling, perform a channel estimation according to pilot information, and evaluate whether or not the channel quality of the Macro BS1 and the Femto BS3 is suitable for switching. In this embodiment, when the MS2 determines the Macro BS1 to be the target base station to be switched to by decoding the auxiliary detection signaling S12 and S32, the MS2 can obtain basic information of the Macro BS1 from the current serving base station Femto BS2 and get ready to perform a switching operation, or the MS2 can directly scan the carrier frequency F1 of the Macro BS1 to obtain basic information of the Macro BS1 to initiate a switching operation.

Embodiment 6

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS2 is the Femto BS2, as shown in FIG. 7.

In this embodiment, each base station sends auxiliary detection signaling on appropriate resource blocks of carrier frequencies of base stations described in a neighboring cell list of the each base station.

It is assumed in this embodiment that the Femto BS2, the Femto BS3 and the Femto BS4 are included in a neighboring cell list of the Macro BS1, the Macro BS1 and the Femto BS3 are included in a neighboring cell list of the Femto BS2, the Macro BS1 and the Femto BS2 are included in a neighboring cell list of the Femto BS3, and the Macro BS1 is included in a neighboring cell list of the Femto BS4, then the Macro BS1 sends auxiliary detection signaling on appropriate resource blocks of the carrier frequencies F2, F3 and F4, the Femto BS2 sends auxiliary detection signaling on appropriate resource blocks of the carrier frequencies F1 and F3, the Femto BS3 sends auxiliary detection signaling on appropriate resource blocks of the carrier frequencies F1 and F2, and the Femto BS4 sends auxiliary detection signaling on appropriate resource blocks of the carrier frequency F1.

Figure 10:
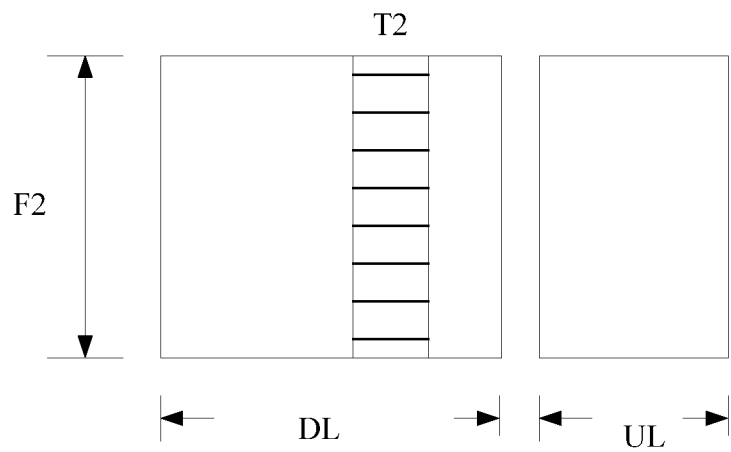
FIG. 10 is a schematic diagram illustrating a method for sending auxiliary detection signaling according to Embodiment 6.

In this embodiment, taking the carrier frequency F2 of the Femto BS2 as an example, the Femto BS2 notifies, through corresponding signaling, the Macro BS1 and the Femto BS3 of location information of the resource blocks for sending auxiliary detection signaling at the carrier frequency F2. As shown in FIG. 10, S12 and S32 respectively represent the auxiliary detection signaling sent by the Macro BS1 and Femto BS3 at the carrier frequency F2 and occupy the same time slot T2. S12 and S32 are respectively one code word sequence in a predetermined group of orthogonal or quasi-orthogonal code word sequences.

For the Macro BS1, other base stations send auxiliary detection signaling in a time slot T1; for the Femto BS3, other base stations send auxiliary detection signaling in a time slot T3; and for the Femto BS4, other base stations send auxiliary detection signaling in a time slot T4; wherein T1, T2, T3 and T4 may be the same or different.

In this embodiment, the Femto BS2 notifies, through corresponding signaling, the MS2 to scan the time slot T2 at the carrier frequency F2 and evaluate whether or not the channel quality of the Macro BS1 and the Femto BS3 is suitable for switching by decoding the auxiliary detection signaling. In this embodiment, when the MS2 determines the Macro BS1 to be the target base station to be switched to by decoding the auxiliary detection signaling S12 and S32, the MS2 can obtain basic information of the Macro BS1 from the current serving base station Femto BS2 and get ready to perform a switching operation, or the MS2 can directly scan the carrier frequency F1 of the Macro BS1 to obtain basic information of the Macro BS1 to initiate a switching operation.

Embodiment 7

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3. Fc is a common carrier frequency resource, at which the Macro BS1, the Femto BS2, the Femto BS3 and the Femto BS4 can all send messages.

In this embodiment, the Macro BS1, the Femto BS2, the Femto BS3 and the Femto BS4 send auxiliary detection signaling on appropriate resource blocks of the carrier frequency Fc.

Figure 11:
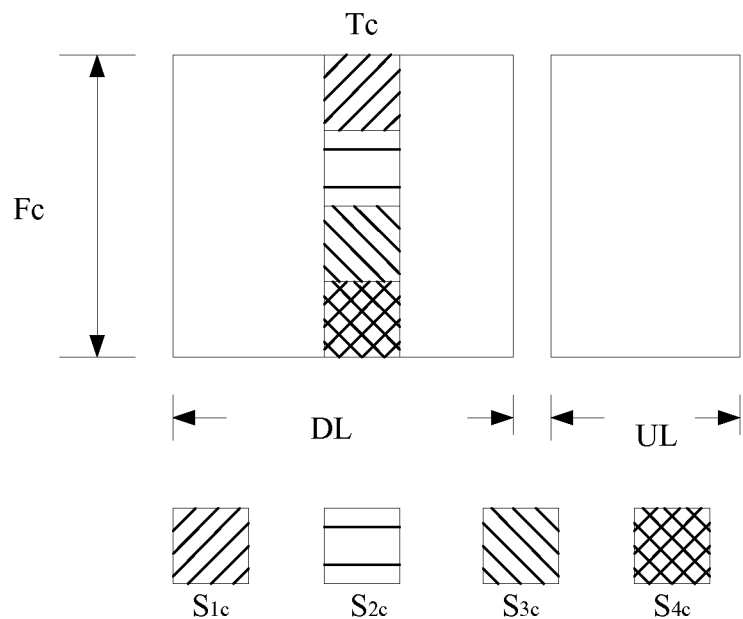
FIG. 11 is a schematic diagram illustrating a method for sending auxiliary detection signaling according to Embodiment 7.

In this embodiment, an upper-layer network element notifies, through corresponding signaling, the Macro BS1, the Femto BS2, the Femto BS3 and the Femto BS4 of location information of the resource blocks for sending auxiliary detection signaling at the carrier frequency Fc. As shown in FIG. 11, S1c, S2c, S3c and S4c, which respectively represent the auxiliary detection signaling sent by the Macro BS1, the Femto BS2, the Femto BS3 and the Femto BS4 at the carrier frequency Fc, are four groups of pilot sequences that are mutually orthogonal and occupy the same time slot Tc.

Time slot resources Tc occupied by the base stations to send the auxiliary detection signaling at different common carrier frequencies may be the same or different.

In this embodiment, the Macro BS1 notifies, through corresponding signaling, the MS1 to scan the time slot Tc at the carrier frequency Fc, decode the auxiliary detection signaling, perform a channel estimation according to pilot information, and evaluate whether or not the channel quality of the Femto BS2, the Femto BS3 and the Femto is BS4 is suitable for switching. In this embodiment, when the MS1 determines the Femto BS2 to be the target base station to be switched to by decoding the auxiliary detection signaling S2c, S3c and S4c, the MS1 can obtain basic information of the Femto BS2 from the current serving base station Macro BS1 and get ready to perform a switching operation, or the MS1 can directly scan the carrier frequency F2 of the Femto BS2 to obtain basic information of the Femto BS2 to initiate a switching operation.

Embodiment 8

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3. Fc is a common carrier frequency resource, at which the Macro BS1, the Femto BS2, the Femto BS3 and the Femto BS4 can all send messages.

In this embodiment, the Macro BS1, the Femto BS2, the Femto BS3 and the Femto BS4 send auxiliary detection signaling on appropriate resource blocks of the carrier frequency Fc.

Figure 12:
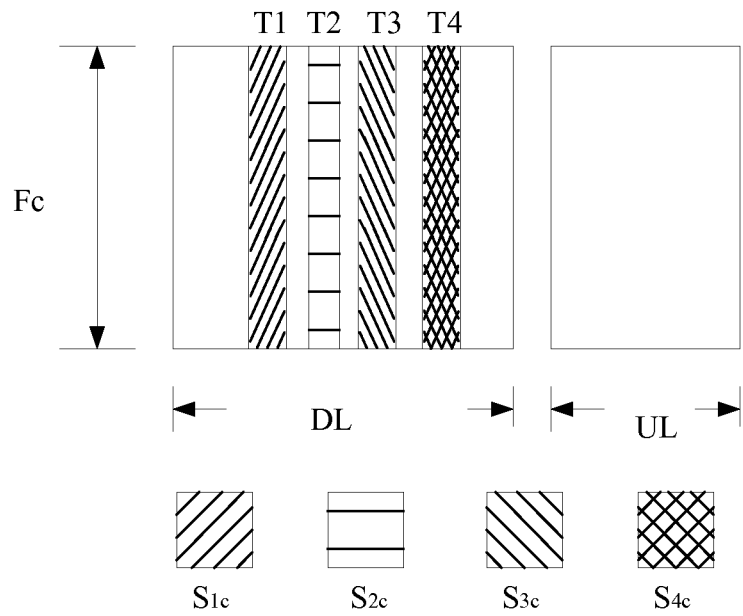
FIG. 12 is a schematic diagram illustrating a method for sending auxiliary detection signaling according to Embodiment 8.

In this embodiment, an upper-layer network element notifies, through corresponding signaling, the Macro BS1, the Femto BS2, the Femto BS3 and the Femto BS4 of location information of the resource blocks for sending auxiliary detection signaling at the carrier frequency Fc. As shown in FIG. 12, S1c, S2c, S3c and S4c, which respectively represent the auxiliary detection signaling sent by the Macro BS1, the Femto BS2, the Femto BS3 and the Femto BS4 at the carrier frequency Fc, are four groups of pilot sequences that occupy different time slots T1, T2, T3 and T4, respectively.

Time slot resources occupied by the base stations to send the auxiliary detection signaling at different common carrier frequencies may be the same or different.

In this embodiment, the Macro BS1 notifies, through corresponding signaling, the MS1 to scan the time slots T2, T3 and T4 at the carrier frequency Fc, decode the auxiliary detection signaling, perform a channel estimation according to pilot information, and evaluate whether or not the channel quality of the Femto BS2, the Femto BS3 and the Femto BS4 is suitable for switching. In this embodiment, when the MS1 determines the Femto BS2 to be the target base station to be switched to by decoding the auxiliary detection signaling S2c, S3c and S4c, the MS1 can obtain basic information of the Femto BS2 from the current serving base station Macro BS1 and get is ready to perform a switching operation, or the MS1 can directly scan the carrier frequency F2 of the Femto BS2 to obtain basic information of the Femto BS2 to initiate a switching operation.

Embodiment 9

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3. Fc is a common carrier frequency resource, at which the Macro BS1, the Femto BS2, the Femto BS3 and the Femto BS4 can all send information.

In this embodiment, the Macro BS1, the Femto BS2, the Femto BS3 and the Femto BS4 send auxiliary detection signaling on appropriate resource blocks of the carrier frequency Fc.

Figure 13:
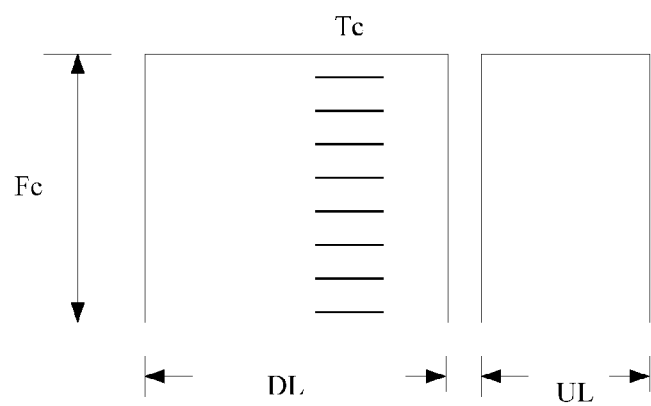
FIG. 13 is a schematic diagram illustrating a method for sending auxiliary detection signaling according to Embodiment 9.

In this embodiment, an upper-layer network element notifies, through corresponding signaling, the Macro BS1, the Femto BS2, the Femto BS3 and the Femto BS4 of location information of the resource blocks for sending auxiliary detection signaling at the carrier frequency Fc. As shown in FIG. 13, S1c, S2c, S3c and S4c, which respectively represent the auxiliary detection signaling sent by the Macro BS1, the Femto BS2, the Femto BS3 and the Femto BS4 at the carrier frequency Fc, occupy the same time slot Tc and are four code cord sequences in a predetermined group of mutually orthogonal or quasi-orthogonal code word sequences.

Time slot resources occupied by the base stations to send the auxiliary detection signaling at different common carrier frequencies may be the same or different.

In this embodiment, the Macro BS1 notifies, through corresponding signaling, the MS1 to scan the time slot Tc at the carrier frequency Fc and evaluate whether or not the channel quality of the Femto BS2, the Femto BS3 and the Femto BS4 is suitable for switching by decoding the auxiliary detection signaling. In this embodiment, when the MS1 determines the Femto BS2 to be the target base station to be switched to by decoding the auxiliary detection signaling S2c, S3c and S4c, the MS1 can obtain basic information of the Femto BS2 from the current serving base station Macro BS1 and get ready to perform a switching operation, or the MS1 can directly scan the carrier frequency F2 of the Femto BS2 to obtain basic information of the Femto BS2 to initiate a switching operation.

Embodiment 10

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3. Fc1 is a common carrier frequency resource, at which the Macro BS1 and the Femto BS2 may send messages; Fc2 is another common carrier frequency resource, at which the Femto BS3 and the Femto BS4 may send messages.

In this embodiment, the Macro BS1 and the Femto BS2 send auxiliary detection signaling on appropriate resource blocks of the carrier frequency Fc1, and the Femto BS3 and the Femto BS4 send auxiliary detection signaling on appropriate resource blocks of the carrier frequency Fc2.

Figure 14:
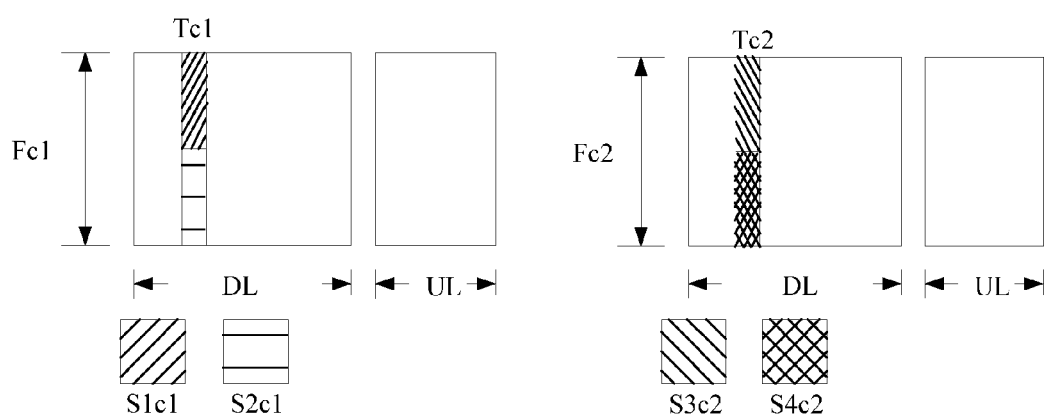
FIG. 14 is a schematic diagram illustrating a method for sending auxiliary detection signaling according to Embodiment 10.

In this embodiment, an upper-layer network element notifies, through corresponding signaling, the Macro BS1 and the Femto BS2 of location information of the resource blocks for sending auxiliary detection signaling at the carrier frequency Fc1 and the Femto BS3 and the Femto BS4 of location information of the resource block for sending auxiliary detection signaling at the carrier frequency Fc2. As shown in FIG. 14, S1c1, S2c1, S3c2 and S4c2, which respectively represent the auxiliary detection signaling sent by the Macro BS1, the Femto BS2, the Femto BS3 and the Femto BS4, are four groups of pilot sequences. S1c1 and S2c1 occupy the same time slot Tc1 and are mutually orthogonal. S3c2 and S4c2 occupy the same time slot Tc2 and are mutually orthogonal.

Time slot resources occupied by the base stations to send the auxiliary detection signaling at different common carrier frequencies may be the same or different.

In this embodiment, the Macro BS1 notifies, through corresponding signaling, the MS1 to scan the time slot Tc1 at the carrier frequency Fc1 and the time slot Tc2 at the carrier frequency Fc2, decode the auxiliary detection signaling, perform a channel estimation according to pilot information, and evaluate whether the channel quality of the Femto BS2, the Femto BS3 and the Femto BS4 is suitable for switching. In this embodiment, when the MS1 determines the Femto BS2 to be the target base station to be switched to by decoding the auxiliary detection signaling S2c1, S3c2 and S4c2, the MS1 can obtain basic information of the Femto BS2 from the current serving base station Macro BS1 and get ready to perform a switching operation, or the MS1 can directly scan the carrier frequency F2 of the Femto BS2 to obtain basic information of the Femto BS2 to initiate a switching operation.

Embodiment 11

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3. Fc1 is a common carrier frequency resource, at which the Macro BS1 and the Femto BS2 may send messages; Fc2 is another common carrier frequency resource, at which the Femto BS3 and the Femto BS4 may send messages.

In this embodiment, the Macro BS1 and the Femto BS2 send auxiliary detection signaling on appropriate resource blocks of the carrier frequency Fc1, and the Femto BS3 and the Femto BS4 send auxiliary detection signaling on appropriate resource blocks of the carrier frequency Fc2.

Figure 15:
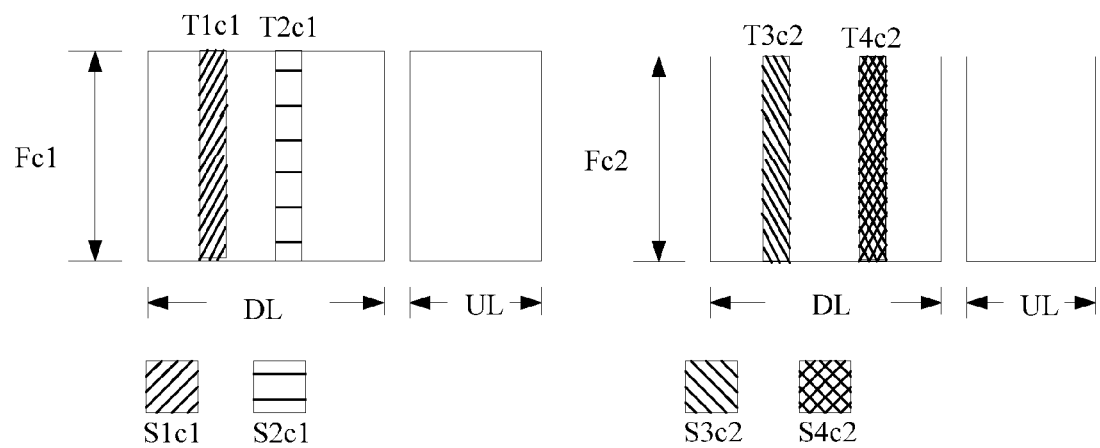
FIG. 15 is a schematic diagram illustrating a method for sending auxiliary detection signaling according to Embodiment 11.

In this embodiment, an upper-layer network element notifies, through corresponding signaling, the Macro BS1 and the Femto BS2 of location information of the resource blocks for sending auxiliary detection signaling at the carrier frequency Fc1 and the Femto BS3 and the Femto BS4 of location information of the resource blocks for sending auxiliary detection signaling at the carrier frequency Fc2. As shown in FIG. 15, S1c1, S2c1, S3c2 and S4c2, which respectively represent the auxiliary detection signaling sent by the Macro BS1, the Femto BS2, the Femto BS3 and the Femto BS4, are four groups of pilot sequences. S1c1 and S2c1 occupy different time slots T1c1 and T2c1 respectively, and S3c2 and S4c2 occupy different time slots T3c2 and T4c2 respectively.

Time slot resources occupied by the base stations to send the auxiliary detection signaling at different common carrier frequencies may be the same or different.

In this embodiment, the Macro BS1 notifies, through corresponding signaling, the MS1 to scan the time slots T1c1 and T2c2 at the carrier frequency Fc1 and the time slots T3c2 and T4c2 at the carrier frequency Fc2, decode the auxiliary detection signaling, perform a channel estimation according to pilot information, and evaluate whether the channel quality of the Femto BS2, the Femto BS3 and the Femto BS4 is suitable for switching. In this embodiment, when the MS1 determines the Femto BS2 to be the target base station to be switched to by decoding the auxiliary detection signaling S2c1, S3c2 and S4c2, the MS1 can obtain basic information of the Femto BS2 from the current serving base station Macro BS1 and get ready to perform a switching operation, or the MS1 can directly scan the carrier frequency F2 of the Femto BS2 to obtain basic information of the Femto BS2 to initiate a switching operation.

Embodiment 12

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3. Fc1 is a common carrier frequency resource, at which the Macro BS1 and the Femto BS2 may send messages; Fc2 is another common carrier frequency resource, at which the Femto BS3 and the Femto BS4 may send messages.

In this embodiment, the Macro BS1 and the Femto BS2 send auxiliary detection signaling on appropriate resource blocks of the carrier frequency Fc1, and the Femto BS3 and the Femto BS4 send auxiliary detection signaling on appropriate resource blocks of the carrier frequency Fc2.

Figure 16:
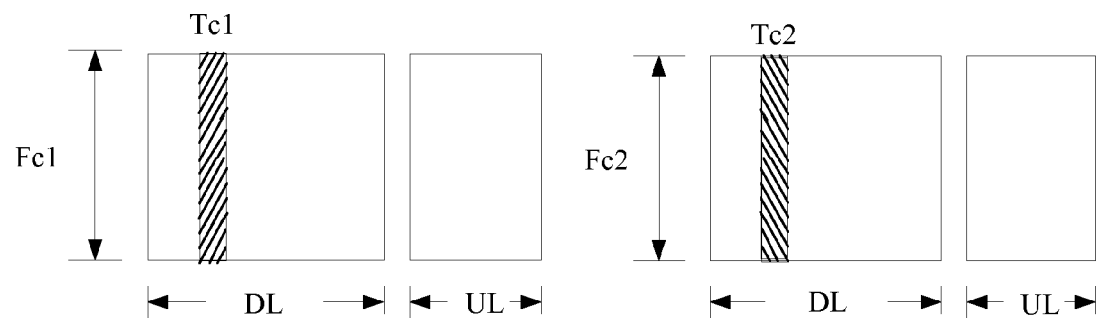
FIG. 16 is a schematic diagram illustrating a method for sending auxiliary detection signaling according to Embodiment 12.

In this embodiment, an upper-layer network element notifies, through corresponding signaling, the Macro BS1 and the Femto BS2 of location information of the resource blocks for sending auxiliary detection signaling at the carrier frequency Fc1 and the Femto BS3 and the Femto BS4 of location information of the resource blocks for sending auxiliary detection signaling at the carrier frequency Fc2. As shown in FIG. 16, S1c1, S2c1, S3c2 and S4c2, which respectively represent the auxiliary detection signaling sent by the Macro BS1, the Femto BS2, the Femto BS3 and the Femto BS4, are four code word sequences in a predetermined group of orthogonal or quasi-orthogonal code word sequences. S1c1 and S2c1 occupy the same time slot Tc1, and S3c2 and S4c2 occupy the same time slot Tc2;

Time slot resources occupied by the base stations to send the auxiliary detection signaling at different common carrier frequencies may be the same or different.

In this embodiment, the Macro BS1 notifies, through corresponding signaling, the MS1 to scan the time slot Tc1 at the carrier frequency Fc1 and the time slot Tc2 at the carrier frequency Fc2, decode the auxiliary detection signaling, and evaluate whether or not the channel quality of the Femto BS2, the Femto BS3 and the Femto BS4 is suitable for switching. In this embodiment, when the MS1 determines the Femto BS2 to be the target base station to be switched to by decoding the auxiliary detection signaling S2c1, S3c2 and S4c2, the MS1 can obtain basic information of the Femto BS2 from the current serving base station Macro BS1 and get ready to perform a switching operation, or the MS1 can directly scan the carrier frequency F2 of the Femto BS2 to obtain basic information of the Femto BS2 to initiate a switching operation.

Embodiment 13

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3.

In this embodiment, the Macro BS1 sends auxiliary detection signaling on appropriate resource blocks of the carrier frequencies F2, F3 and F4, the Femto BS2 sends auxiliary detection signaling on appropriate resource blocks of the carrier frequencies F1, F3 and F4, the Femto BS3 sends auxiliary detection signaling on appropriate resource blocks of the carrier frequencies F1, F2 and F4, and the Femto BS4 sends auxiliary detection signaling on appropriate resource blocks of the carrier frequencies F1, F2 and F3.

Figure 17:
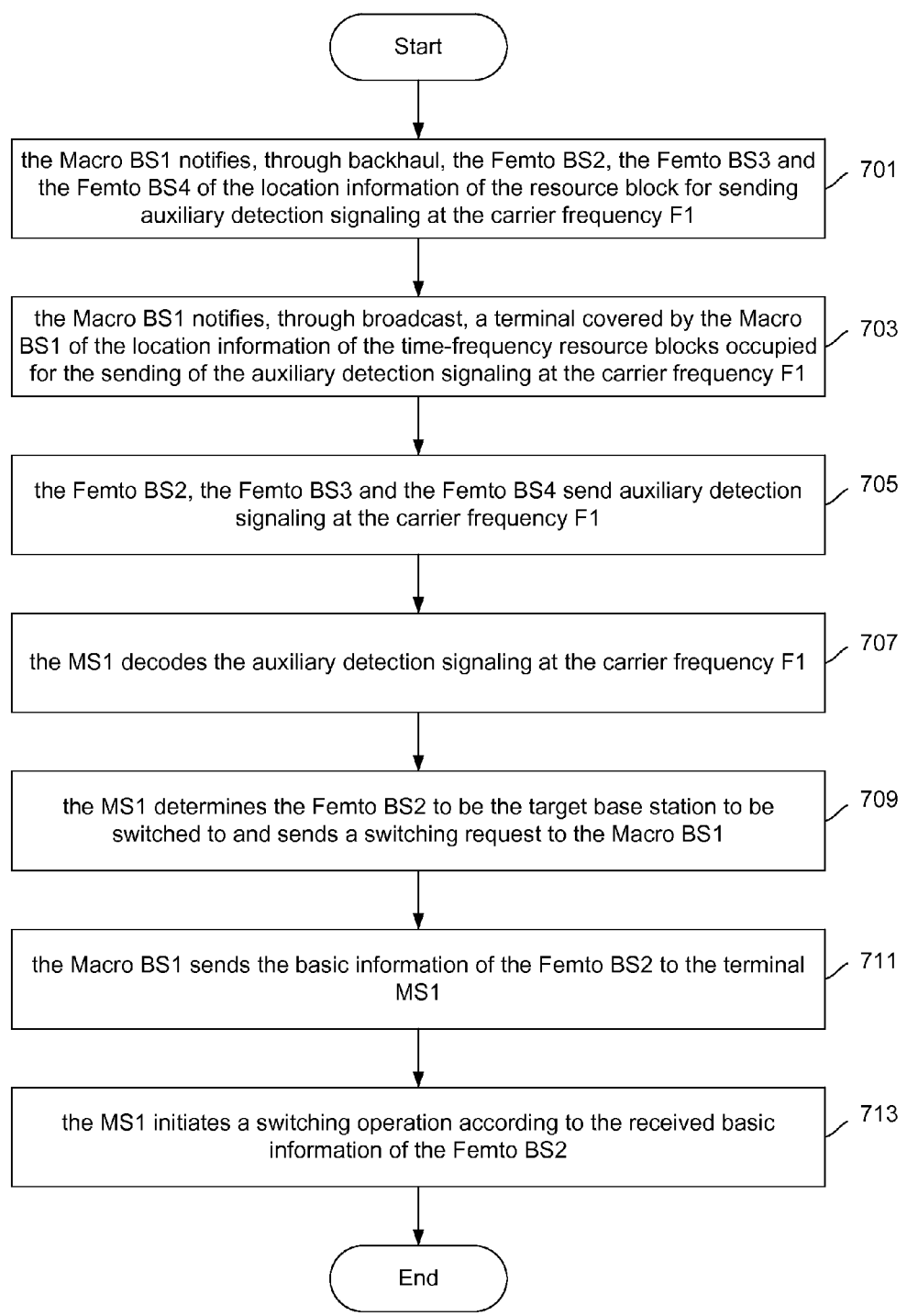
FIG. 17 is a flow chart of a method for sending and receiving auxiliary detection signaling according to Embodiment 13.

In this embodiment, taking the carrier frequency F1 of the Macro BS1 as an example, FIG. 17 is a specific flow chart illustrating the sending and receiving of auxiliary detection signaling according to this embodiment, as shown in FIG. 17, the method provided in this embodiment for sending and receiving auxiliary detection signaling mainly comprises the following steps.

Step 701: the Macro BS1 notifies, through backhaul, the Femto BS2, the Femto BS3 and the Femto BS4 of location information of the resource blocks for sending auxiliary detection signaling at the carrier frequency F1. As shown in FIG. 4, S21, S31 and S41, which respectively represent the auxiliary detection signaling sent by the Femto BS2, the Femto BS3 and the Femto BS4 at the carrier frequency F1, are three groups of pilot sequences that are mutually orthogonal and occupy the same time slot T1;

for the Femto BS2, other base stations occupy a time slot T2 to send auxiliary detection signaling; for the Femto BS3, other base stations occupy a time slot T3 to send auxiliary detection signaling; and for the Femto BS4, other base stations occupy a time slot T4 to send auxiliary detection signaling; wherein T1, T2, T3 and T4 may be the same or different;

Step 703: the Macro BS1 sends related signaling through a broadcast channel to notify a terminal covered by the Macro BS1 of the location information of the time-frequency resource block occupied for the sending of the auxiliary detection signaling at the carrier frequency F1;

Step 705: the Femto BS2, the Femto BS3 and the Femto BS4 send auxiliary detection signaling at the carrier frequency F1;

Step 707: the MS1 scans the time slot T1 at the carrier frequency F1, decodes the auxiliary detection signaling S21, S31 and S41, performs a channel estimation according to obtained pilot information, and evaluates whether or not the channel quality of the Femto BS2, the Femto BS3 and the Femto BS4 is suitable for switching;

Step 709: the MS1 determines the Femto BS2 to be the target base station to be switched to by decoding the auxiliary detection signaling S21, S31 and S41, and sends a switching request to the current serving base station Macro BS1;

Step 711: after receiving the switching request, the Macro BS1 sends basic information of the Femto BS2 to the terminal MS1; and Step 713: the MS1 initiates a switching operation according to the received basic information of the Femto BS2.

Embodiment 14

Figure 18:
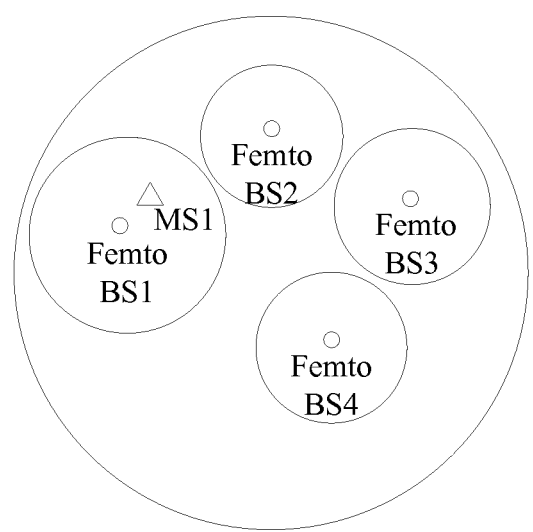
FIG. 18 is a schematic diagram illustrating yet another distribution of base stations and a terminal in a wireless communication system according to an embodiment of the present invention.

In this embodiment, in a wireless communication system there coexist a Femto BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Femto BS1, as shown in FIG. 18.

In this embodiment, the Femto BS1 sends auxiliary detection signaling on appropriate resource blocks of the carrier frequencies F2, F3 and F4, the Femto BS2 sends auxiliary detection signaling on appropriate resource blocks of the carrier frequencies F1, F3 and F4, the Femto BS3 sends auxiliary detection signaling on appropriate resource blocks of the carrier frequencies F1, F2 and F4, and the Femto BS4 sends auxiliary detection signaling on appropriate resource blocks of the carrier frequencies F1, F2 and F3.

In this embodiment, taking the carrier frequency F1 of the Femto BS1 as an example, FIG. 17 is a specific flow chart illustrating the sending and receiving of auxiliary detection signaling according to this embodiment, as shown in FIG. 17, the method provided in this embodiment for sending and receiving auxiliary detection signaling mainly comprises the following steps.

Step 901: an upper-layer network element notifies, through corresponding signaling, the Femto BS2, the Femto BS3 and the Femto BS4 of location information of the resource blocks for sending auxiliary detection signaling at the carrier frequency F1;

as shown in FIG. 4, S21, S31 and S41, which respectively represent the auxiliary is detection signaling sent by the Femto BS2, the Femto BS3 and the Femto BS4 at the carrier frequency F1, are three groups of pilot sequences that are mutually orthogonal and occupy the same time slot T1;

for the Femto BS2, other base stations occupy a time slot T2 to send auxiliary detection signaling; for the Femto BS3, other base stations occupy a time slot T3 to send auxiliary detection signaling; and for the Femto BS4, other base stations occupy a time slot T4 to send auxiliary detection signaling; wherein T1, T2, T3 and T4 may be the same or different;

Step 903: the Femto BS1 sends related signaling through a broadcast channel to notify a terminal covered by the Femto BS1 of the location information of the time-frequency resource block occupied for the sending of the auxiliary detection signaling at the carrier frequency F1;

Step 905: the Femto BS2, the Femto BS3 and the Femto BS4 send auxiliary detection signaling at the carrier frequency F1;

Step 907: the MS1 scans the time slot T1 at the carrier frequency F1 and decodes the auxiliary detection signaling S21, S31 and S41;

Step 909: the MS1 performs a channel estimation according to obtained pilot information, evaluates whether or not the channel quality of the Femto BS2, the Femto BS3 and the Femto BS4 is suitable for switching, determines the Femto BS2 to be the target base station to be switched to by decoding the auxiliary detection signaling S21, S31 and S41, and sends a switching request to the current serving base station Femto BS1;

Step 911: the Femto BS1 sends basic information of the Femto BS2 to the MS1; and Step 913: the MS1 initiates a switching operation according to the received basic information of the Femto BS2.

Embodiment 15

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3.

In the wireless communication system, the Macro BS1 sends auxiliary detection signaling on appropriate resource blocks of the carrier frequencies F2, F3 and F4, the Femto BS2 sends auxiliary detection signaling on appropriate resource blocks of the carrier frequencies F1, F3 and F4, the Femto BS3 sends auxiliary detection signaling on appropriate resource blocks of the carrier frequencies F1, F2 and F4, and the Femto BS4 sends auxiliary detection signaling on appropriate resource blocks of the carrier frequencies F1, F2 and F3.

In this embodiment, taking the carrier frequency F1 of the Macro BS1 as an example, the Macro BS1 notifies, through corresponding signaling, the Femto BS2, the Femto BS3 and the Femto BS4 of location information of the resource blocks for sending auxiliary detection signaling at the carrier frequency F1. As shown in FIG. 4, S21, S31 and S41, which respectively represent the auxiliary detection signaling sent by the Femto BS2, the Femto BS3 and the Femto BS4 at the carrier frequency F1, occupy different time-frequency resource blocks. Each of S21, S31 and S41 contains indication information indicative of whether or not its corresponding base station (i.e., the Femto BS2, the Femto BS3 or the Femto BS4) allows access of more new terminals. In this embodiment, a bit '1' represents a corresponding base station allowing access of a new terminal, and a bit '0' represents a corresponding base station forbidding access of a new terminal. In this embodiment, the corresponding bits of the auxiliary detection signaling S21 and S31 are '1' if it is assumed that the Femto BS2 and the Femto BS3 allow the access of a new terminal, and the corresponding bit of the auxiliary detection signaling S41 is '0' if it is assumed that the Femto BS4 forbids the access of a new terminal.

In this embodiment, the Macro BS1 notifies, through corresponding signaling, the MS1 of the location information of the resource blocks where the Femto BS2, the Femto BS3 and the Femto BS4 send auxiliary detection signaling, and the MS1 decodes the auxiliary detection signaling and determines the Femto BS2 and the Femto BS3 to be accessible target base stations. And the MS1 can obtain basic information of the Femto BS2 and the Femto BS3 from the current serving base station Macro BS1.

Embodiment 16

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3.

In the wireless communication system, the Macro BS1 sends auxiliary detection signaling on appropriate resource blocks of the carrier frequencies F2, F3 and F4, the Femto BS2 sends auxiliary detection signaling on appropriate resource blocks of the carrier frequencies F1, F3 and F4, the Femto BS3 sends auxiliary detection signaling on appropriate resource blocks of the carrier frequencies F1, F2 and F4, and the Femto BS4 sends auxiliary detection signaling on appropriate resource blocks of the carrier frequencies F1, F2 and F3.

In this embodiment, taking the carrier frequency F1 of the Macro BS1 as an example, the Macro BS1 notifies, through corresponding signaling, the Femto BS2, the Femto BS3 and the Femto BS4 of location information of the resource blocks for sending auxiliary detection signaling at the carrier frequency F1. As shown in FIG. 4, S21, S31 and S41, which respectively represent the auxiliary detection signaling sent by the Femto BS2, the Femto BS3 and the Femto BS4 at the carrier frequency F1, occupy different time-frequency resource blocks. Each of S21, S31 and S41 contains index number of its corresponding base station (i.e., the Femto BS2, the Femto BS3 or the Femto BS4) and indication information indicative of whether or not the corresponding base station allows access of more terminals. In this embodiment, the index numbers of the Femto BS2, the Femto BS3 and the Femto BS4 are '01', '10' and '11', respectively; a bit '1' represents a corresponding base station allowing access of a new terminal, and a bit '0' represents a corresponding base station forbidding access of a new terminal. In this embodiment, the corresponding bits of the auxiliary detection signaling S21 and S31 are '1' if it is assumed that the Femto BS2 and the Femto BS3 allow the access of a new terminal, and the corresponding bit of the auxiliary detection signaling S41 is '0' if it is assumed that the Femto BS4 forbids the access of a new terminal, that is, S21, S31 and S41 are '01 1', '10 1' and '11 0', respectively.

In this embodiment, the Macro BS1 notifies, through corresponding signaling, the MS1 of the location information of the resource blocks where auxiliary detection signaling is sent. The terminal MS1 decodes the auxiliary detection signaling and determines the target base stations with index numbers '01' and '10' to be accessible target base stations. Therefore, the MS1 can obtain, from the current serving base station Macro BS1, basic information of the base stations with index numbers '01' and '10', that is, the basic information of the Femto BS2 and the Femto BS3.

Embodiment 17

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3.

In the wireless communication system, the Macro BS1 sends auxiliary detection signaling on appropriate resource blocks of the carrier frequencies F2, F3 and F4, the Femto BS2 sends auxiliary detection signaling on appropriate resource blocks of the carrier frequencies F1, F3 and F4, the Femto BS3 sends auxiliary detection signaling on appropriate resource blocks of the carrier frequencies F1, F2 and F4, and the Femto BS4 sends auxiliary detection signaling on appropriate resource blocks of the carrier frequencies F1, F2 and F3.

In this embodiment, taking the carrier frequency F1 of the Macro BS1 as an example, the Macro BS1 notifies, through corresponding signaling, the Femto BS2, the Femto BS3 and the Femto BS4 of location information of the resource blocks for sending auxiliary detection signaling at the carrier frequency F1. As shown in FIG. 4, S21, S31 and S41, which respectively represent the auxiliary detection signaling sent by the Femto BS2, the Femto BS3 and the Femto BS4 at the carrier frequency F1, occupy different time-frequency resource blocks. Each of S21, S31 and S41 contains indication information indicative of whether or not its corresponding base station (i.e., the Femto BS2, the Femto BS3 or the Femto BS4) allows access of more new terminals and indication information indicative of a limitation on the type of accessed terminals. In this embodiment, a bit '1' represents a corresponding base station allowing access of a new terminal, and a bit '0' represents a corresponding base station forbidding access of a new terminal. In this embodiment, the corresponding bits of the auxiliary detection signaling S21 and S31 are '1' if it is assumed that the Femto BS2 and the Femto BS3 allow the access of a new terminal, and the corresponding bit of the auxiliary detection signaling S41 is '0' if it is assumed that the Femto BS4 forbids the access of a new terminal. In this embodiment, bits '11' represent that a corresponding base station makes restrictions on accessed terminals, bits '00' represent that a corresponding base station makes no restrictions on accessed terminals. The corresponding bits of the auxiliary detection signaling S21 and S41 are '00' if it is assumed that the Femto BS2 and the Femto BS4 make no restrictions on the accessed terminals. The corresponding bits of the auxiliary detection signaling S31 are '11' and the terminal group identifier of a terminal which is allowed to access the Femto BS3 is '0101' if it is assumed that the Femto BS3 makes restrictions on the accessed terminals.

In this embodiment, the Macro BS1 notifies, through corresponding signaling, the MS1 of the location information of the resource blocks where the Femto BS2, the Femto BS3 and the Femto BS4 send auxiliary detection signaling. The terminal MS1 decodes is the auxiliary detection signaling, determines the Femto BS2 and the Femto BS3 to be accessible target base stations, further determines that the Femto BS2 makes no restrictions on the accessed terminals, and the Femto BS4 makes restrictions on the accessed terminals and only allows access of a terminal with a terminal group identifier '0101'. The MS1 can obtain basic information of the Femto BS2 and the Femto BS3 from the current serving base station Macro BS1 if a group identifier of the terminal MS1 is '0101'; the MS1 can obtain basic information of the Femto BS2 from the current serving base station Macro BS1 if the group identifier of the terminal MS1 is not '0101'.

Embodiment 18

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3.

In the wireless communication system, the Macro BS1 sends auxiliary detection signaling on appropriate resource blocks of the carrier frequencies F2, F3 and F4, the Femto BS2 sends auxiliary detection signaling on appropriate resource blocks of the carrier frequencies F1, F3 and F4, the Femto BS3 sends auxiliary detection signaling on appropriate resource blocks of the carrier frequencies F1, F2 and F4, and the Femto BS4 sends auxiliary detection signaling on appropriate resource blocks of the carrier frequencies F1, F2 and F3.

In this embodiment, taking the carrier frequency F1 of the Macro BS1 as an example, the Macro BS1 notifies, through corresponding signaling, the Femto BS2, the Femto BS3 and the Femto BS4 of location information of the resource blocks for sending auxiliary detection signaling at the carrier frequency F1. As shown in FIG. 6, S21, S31 and S41, which respectively represent the auxiliary detection signaling sent by the Femto BS2, the Femto BS3 and the Femto BS4 at the carrier frequency F1, occupy the same time-frequency resource block. Each of S21, S31 and S41 contains indication information indicative of whether or not its corresponding base station (i.e., the Femto BS2, the Femto BS3 or the Femto BS4) allows access of more new terminals and indication information indicative of a limitation on the type of accessed terminals. In this embodiment, a bit '1' represents a corresponding base station allowing access of a new terminal, and a bit '0' represents a corresponding base station forbidding access of a new terminal. The corresponding bits of the auxiliary detection signaling S21 and S31 are '1' if it is assumed that the Femto BS2 and the Femto BS4 allow the access of a is new terminal, and the corresponding bit of the auxiliary detection signaling S41 is '0' if it is assumed that the Femto BS3 forbids the access of a new terminal. In this embodiment, bits '11' represent that a corresponding base station makes restrictions on accessed terminals, bits '00' represent that a corresponding base station makes no restrictions on accessed terminals. The corresponding bits of the auxiliary detection signaling S21 and S41 are '00' if it is assumed that the Femto BS2 and the Femto BS4 make no restrictions on the accessed terminals. The corresponding bits of the auxiliary detection signaling S31 are '11' and a terminal group identifier of a terminal which is allowed to access the Femto BS3 is '0101' if it is assumed that the Femto BS3 makes restrictions on the accessed terminals.

The Femto BS2, the Femto BS3 and the Femto BS4 respectively adopt different code word sequences in a group of orthogonal code word sequence sets to perform spectrum spreading on S21, S31 and S41 and then send the spread S21, S31 and S41 at the carrier frequency F1. And the Macro BS1 knows which code word sequences have been adopted by the Femto BS2, the Femto BS3 and the Femto BS4.

In this embodiment, the Macro BS1 notifies, through corresponding signaling, the MS1 of the adopted code word sequences and the location information of the resource blocks where the Femto BS2, the Femto BS3 and the Femto BS4 send auxiliary detection signaling. The terminal MS1 decodes the auxiliary detection signaling, determines the Femto BS2 and the Femto BS3 to be accessible target base stations, further determines that the Femto BS2 makes no restrictions on the accessed terminals, and the Femto BS4 makes restrictions on the accessed terminals and only allows access of a terminal with a terminal group identifier '0101'. The MS1 can obtain basic information of the Femto BS2 and the Femto BS3 from the current serving base station Macro BS1 if a group identifier of the terminal MS1 is '0101'; the MS1 can obtain basic information of the Femto BS2 from the current serving base station Macro BS1 if the group identifier of the terminal MS1 is not '0101'.

Embodiment 19

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3.

In the wireless communication system, the Macro BS1 sends auxiliary detection signaling on appropriate resource blocks of the carrier frequencies F2, F3 and F4, the Femto BS2 sends auxiliary detection signaling on appropriate resource blocks of the carrier frequencies F1, F3 and F4, the Femto BS3 sends auxiliary detection signaling on appropriate resource blocks of the carrier frequencies F1, F2 and F4, and the Femto BS4 sends auxiliary detection signaling on appropriate resource blocks of the carrier frequencies F1, F2 and F3.

In this embodiment, taking the carrier frequency F1 of the Macro BS1 as an example, the Macro BS1 notifies, through corresponding signaling, the Femto BS2, the Femto BS3 and the Femto BS4 of location information of the resource blocks for sending auxiliary detection signaling at the carrier frequency F1. S21, S31 and S41 respectively represent the auxiliary detection signaling sent by the Femto BS2, the Femto BS3 and the Femto BS4 at the carrier frequency F1, wherein S21 and S31 occupy the same time-frequency resource block, and S41 occupies a time-frequency resource block different from that occupied by S21 and S31. Each of S21, S31 and S41 contains indication information indicative of whether or not its corresponding base station (i.e., the Femto BS2, the Femto BS3 or the Femto BS4) allows access of more new terminals and indication information indicative of a limitation on the type of accessed terminals. In this embodiment, a bit '1' represents a corresponding base station allowing access of a new terminal, and a bit '0' represents a corresponding base station forbidding access of a new terminal. In this embodiment, the corresponding bits of the auxiliary detection signaling S21 and S31 are '1' if it is assumed that the Femto BS2 and the Femto BS3 allow the access of a new terminal, and the corresponding bit of the auxiliary detection signaling S41 is '0' if it is assumed that the Femto BS4 forbids the access of a new terminal. In this embodiment, bits '11' represent that a corresponding base station makes restrictions on accessed terminals, bits '00' represent that a corresponding base station makes no restrictions on accessed terminals. The corresponding bits of the auxiliary detection signaling S21 and S41 are '00' if it is assumed that the Femto BS2 and the Femto BS4 make no restrictions on the accessed terminals. The corresponding bits of the auxiliary detection signaling S31 are '11' and a terminal group identifier of a terminal which is allowed to access the Femto BS3 is '0101' if it is assumed that the Femto BS3 makes restrictions on the accessed terminals.

The Femto BS2 and the Femto BS3 respectively adopt different code word sequences in a group of orthogonal code word sequence sets to perform spectrum spreading on S21 and S31 and then send the spread S21 and S31 at the carrier is frequency F1. And the Macro BS1 knows which code word sequences have been adopted by the Femto BS2 and the Femto BS3.

In this embodiment, the Macro BS1 notifies, through corresponding signaling, the MS1 of the location information of the resource blocks where the Femto BS2, the Femto BS3 and the Femto BS4 send auxiliary detection signaling and the code word sequences adopted by the Femto BS2 and the Femto BS3, the terminal MS1 decodes the auxiliary detection signaling, determines the Femto BS2 and the Femto BS3 to be accessible target base stations, further determines that the Femto BS2 makes no restrictions on the accessed terminals, and the Femto BS4 makes restrictions on the accessed terminals and only allows access of a terminal with a terminal group identifier '0101'. The MS1 can obtain basic information of the Femto BS2 and the Femto BS3 from the current serving base station Macro BS1 if a group identifier of the terminal MS1 is '0101'; the MS1 can obtain basic information of the Femto BS2 from the current serving base station Macro BS1 if the group identifier of the terminal MS1 is not '0101'.

Embodiment 20

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3, Fc is a common carrier frequency resource, at which the Macro BS1, Femto BS2, Femto BS3 and Femto BS4 can all send messages.

In this embodiment, the Macro BS1, the Femto BS2, the Femto BS3 and the Femto BS4 send auxiliary detection signaling on appropriate resource blocks of the carrier frequency Fc.

In this embodiment, an upper-layer network element notifies, through corresponding signaling, the Macro BS1, the Femto BS2, the Femto BS3 and the Femto BS4 of location information of the resource blocks for sending auxiliary detection signaling at the carrier frequency Fc. As shown in FIG. 11, S1c, S2c, S3c and S4c, which respectively represent the auxiliary detection signaling sent by the Macro BS1, the Femto BS2, the Femto BS3 and the Femto BS4 at the carrier frequency Fc, occupy different time-frequency resource blocks and each contains indication information indicative of whether or not its corresponding base station (i.e., the Macro BS1, the Femto BS2, the Femto BS3 or the Femto BS4) allows access of more new terminals. In this embodiment, a bit '1' represents a corresponding base station allowing access of is a new terminal, and a bit '0' represents a corresponding base station forbidding access of a new terminal. In this embodiment, the corresponding bits of the auxiliary detection signaling S1c, S2c and S3c are '1' if it is assumed that the Macro BS1, the Femto BS2 and the Femto BS3 allow the access of a new terminal, and the corresponding bit of the auxiliary detection signaling S4c is '0' if it is assumed that the Femto BS4 forbids the access of a new terminal.

In this embodiment, the Macro BS1 notifies, through corresponding signaling, the MS1 of the location information of the resource blocks where the Femto BS2, the Femto BS3 and the Femto BS4 send auxiliary detection signaling, the MS1 decodes the auxiliary detection signaling and determines the Femto BS2 and the Femto BS3 to be accessible target base stations. Therefore, the MS1 can obtain basic information of the Femto BS2 and the Femto BS3 from the current serving base station Macro BS1.

Embodiment 21

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3. Fc is a common carrier frequency resource, at which the Macro BS1, Femto BS2, Femto BS3 and Femto BS4 can all send messages.

In this embodiment, the Macro BS1, the Femto BS2, the Femto BS3 and the Femto BS4 send auxiliary detection signaling on appropriate resource blocks of the carrier frequency Fc.

In this embodiment, an upper-layer network element notifies, through corresponding signaling, the Macro BS1, the Femto BS2, the Femto BS3 and the Femto BS4 of location information of the resource blocks for sending auxiliary detection signaling at the carrier frequency Fc. As shown in FIG. 11, S1c, S2c, S3c and S4c, which respectively represent the auxiliary detection signaling sent by the Macro BS1, the Femto BS2, the Femto BS3 and the Femto BS4 at the carrier frequency Fc, occupy different time-frequency resource blocks and each contains an index number of its corresponding base station (i.e., the Macro BS1, the Femto BS2, the Femto BS3 or the Femto BS4) and indication information indicative of whether or not the corresponding base station allows access of more new terminals. In this embodiment, the index numbers of the Macro BS1, the Femto BS2, the Femto BS3 and the Femto BS4 are '00', '01', '10' and '11', respectively; a bit '1' represents a corresponding base station is allowing access of a new terminal, and a bit '0' represents a corresponding base station forbidding access of a new terminal. In this embodiment, the corresponding bits of the auxiliary detection signaling S1c, S2c and S3c are '1' if it is assumed that the Macro BS1, the Femto BS2 and the Femto BS3 allow the access of a new terminal, and the corresponding bit of the auxiliary detection signaling S4c is '0' if it is assumed that the Femto BS4 forbids the access of a new terminal, that is, S1c, S2c, S3c and S4c are '001', '011', '101' and '110', respectively.

In this embodiment, the Macro BS1 notifies, through corresponding signaling, the MS1 of the location information of the resource blocks where auxiliary detection signaling is sent. The terminal MS1 decodes the auxiliary detection signaling and determines the target base stations with index numbers '01' and '10' to be accessible base stations. Therefore, the MS1 can obtain, from the current serving base station Macro BS1, basic information of the base stations with index numbers '01' and '10', that is, the basic information of the Femto BS2 and the Femto BS3.

Embodiment 22

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3. Fc is a common carrier frequency resource, at which the Macro BS1, Femto BS2, Femto BS3 and Femto BS4 can all send messages.

In this embodiment, the Macro BS1, the Femto BS2, the Femto BS3 and the Femto BS4 send auxiliary detection signaling on appropriate resource blocks of the carrier frequency Fc.

In this embodiment, an upper-layer network element notifies, through corresponding signaling, the Macro BS1, the Femto BS2, the Femto BS3 and the Femto BS4 of location information of the resource blocks for sending auxiliary detection signaling at the carrier frequency Fc. As shown in FIG. 11, S1c, S2c, S3c and S4c, which respectively represent the auxiliary detection signaling sent by the Macro BS1, the Femto BS2, the Femto BS3 and the Femto BS4 at the carrier frequency Fc, occupy different time-frequency resource blocks and each contains indication information indicative of whether or not its corresponding base station (i.e., Macro BS1, the Femto BS2, the Femto BS3 or the Femto BS4) allows access of more new terminals and indication information indicative of a limitation on the type of accessed terminals. In is this embodiment, a bit '1' represents a corresponding base station allowing access of a new terminal, and a bit '0' represents a corresponding base station forbidding access of a new terminal. The corresponding bits of the auxiliary detection signaling S1c, S2c and S3c are '1' if it is assumed that the Macro BS1, the Femto BS2 and the Femto BS3 allow the access of a new terminal, and the corresponding bit of the auxiliary detection signaling S4c is '0' if it is assumed that the Femto BS4 forbids the access of a new terminal. In this embodiment, bits '11' represent that a corresponding base station makes restrictions on accessed terminals, and bits '00' represent that a corresponding base station makes no restrictions on accessed terminals. The corresponding bits of the auxiliary detection signaling S1c, S2c and S4c are '00' if it is assumed that the Macro BS1, the Femto BS2 and the Femto BS4 make no restrictions on the accessed terminals, and the corresponding bits of the auxiliary detection signaling S3c are '11' and a terminal group identifier of a terminal which is allowed to access the Femto BS3 is '0101' if it is assumed that the Femto BS3 makes restrictions on the accessed terminals.

In this embodiment, the Macro BS1 notifies, through corresponding signaling, the MS1 of the location information of the resource blocks where the Femto BS2, the Femto BS3 and the Femto BS4 send auxiliary detection signaling. The terminal MS1 decodes the auxiliary detection signaling, determines the Femto BS2 and the Femto BS3 to be accessible target base stations, further determines that the Femto BS2 makes no restrictions on the accessed terminals, and the Femto BS4 makes restrictions on the accessed terminals and only allows access of a terminal with a terminal group identifier '0101'. The MS1 can obtain basic information of the Femto BS2 and the Femto BS3 from the current serving base station Macro BS1 if a group identifier of the terminal MS1 is '0101'; the MS1 can obtain basic information of the Femto BS2 from the current serving base station Macro BS1 if the group identifier of the terminal MS1 is not '0101'.

Embodiment 23

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3. Fc is a common carrier frequency resource, at which the Macro BS1, Femto BS2, Femto BS3 and Femto BS4 can all send messages.

In this embodiment, the Macro BS1, the Femto BS2, the Femto BS3 and the Femto BS4 send auxiliary detection signaling on appropriate resource blocks of the carrier is frequency Fc.

In this embodiment, an upper-layer network element notifies, through corresponding signaling, the Macro BS1, the Femto BS2, the Femto BS3 and the Femto BS4 of location information of the resource blocks for sending auxiliary detection signaling at the carrier frequency Fc. As shown in FIG. 11, S1c, S2c, S3c and S4c, which respectively represent the auxiliary detection signaling sent by the Macro BS1, the Femto BS2, the Femto BS3 and the Femto BS4 at the carrier frequency Fc, occupy the same time-frequency resource block and each contains indication information indicative of whether or not its corresponding base station (i.e., the Macro BS1, the Femto BS2, the Femto BS3 or the Femto BS4) allows access of more new terminals and indication information indicative of a limitation on the type of accessed terminals. In this embodiment, a bit '1' represents a corresponding base station allowing access of a new terminal, and a bit '0' represents a corresponding base station forbidding access of a new terminal. The corresponding bits of the auxiliary detection signaling S1c, S2c and S3c are '1' if it is assumed that the Macro BS1, the Femto BS2 and the Femto BS3 allow the access of a new terminal, and the corresponding bit of the auxiliary detection signaling S4c is '0' if it is assumed that the Femto BS4 forbids the access of a new terminal. In this embodiment, bits '11' represent that a corresponding base station makes restrictions on accessed terminals, bits '00' represent that a corresponding base station makes no restrictions on accessed terminals. The corresponding bits of the auxiliary detection signaling S1c, S2c and S4c are '00' if it is assumed that the Macro BS1, the Femto BS2 and the Femto BS4 make no restrictions on the accessed terminals, and the corresponding bits of the auxiliary detection signaling S3c are '11' and a terminal group identifier of a terminal which is allowed to access the Femto BS3 is '0101' if it is assumed that the Femto BS3 makes restrictions on the accessed terminals.

The Macro BS1, the Femto BS2, the Femto BS3 and the Femto BS4 respectively adopt different code word sequences in a group of known orthogonal code word sequence sets to perform spectrum spreading on S1c, S2c, S3c and S4c and then send the spread S1c, S2c, S3c and S4c at the carrier frequency Fc.

In this embodiment, the Macro BS1 notifies, through corresponding signaling, the MS1 of the adopted code word sequences and the location information of the resource blocks where the Femto BS2, the Femto BS3 and the Femto BS4 send auxiliary detection signaling. The terminal MS1 decodes the auxiliary detection signaling, determines the Femto BS2 and the Femto BS3 to be accessible target base stations, further determines that the Femto BS2 makes no restrictions on the accessed terminals, and the Femto BS4 makes restrictions on the accessed terminals and only allows access of a terminal with a terminal group identifier '0101'. The MS1 can obtain basic information of the Femto BS2 and the Femto BS3 from the current serving base station Macro BS1 if a group identifier of the terminal MS1 is '0101'; the MS1 can obtain can basic information of the Femto BS2 from the current serving base station Macro BS1 if the group identifier of the terminal MS1 is not '0101'.

Embodiment 24

In this embodiment, in a wireless communication system there coexist a Macro BS1 using F1 as carrier frequency, a Femto BS2 using F2 as carrier frequency, a Femto BS3 using F3 as carrier frequency and a Femto BS4 using F4 as carrier frequency, and a serving base station of a terminal MS1 is the Macro BS1, as shown in FIG. 3. Fc is a common carrier frequency resource, at which the Macro BS1, Femto BS2, Femto BS3 and Femto BS4 can all send messages.

In this embodiment, the Macro BS1, the Femto BS2, the Femto BS3 and the Femto BS4 send auxiliary detection signaling on appropriate resource blocks of the carrier frequency Fc.

In this embodiment, an upper-layer network element notifies, through corresponding signaling, the Macro BS1, the Femto BS2, the Femto BS3 and the Femto BS4 of location information of the resource blocks for sending auxiliary detection signaling at the carrier frequency Fc. S1$c$, S2$c$, S3$c$ and S4$c$ respectively represent the auxiliary detection signaling sent by the Macro BS1, the Femto BS2, the Femto BS3 and the Femto BS4 at the carrier frequency Fc, wherein S1$c$, S2$c$ and S3$c$ occupy the same time-frequency resource block, and S4$c$ occupies a time-frequency resource block different from that occupied by S1$c$, S2$c$ and S3$c$. Each of S1$c$, S2$c$, S3$c$ and S4$c$ contains indication information indicative of whether or not its corresponding base station (i.e., the Macro BS1, the Femto BS2, the Femto BS3 or the Femto BS4) allows access of more new terminals and indication information indicative of a limitation on the type of accessed terminals. In this embodiment, a bit '1' represents a corresponding base station allowing access of a new terminal, and a bit '0' represents a corresponding base station forbidding access of a new terminal. The corresponding bits of the auxiliary detection signaling S1$c$, S2$c$ and S3$c$ are '1' if it is assumed that the Macro BS1, the Femto BS2 and the Femto BS3 allow the access of a new terminal, and the corresponding bit of the auxiliary detection signaling S4$c$ is '0' if it is assumed that the is Femto BS4 forbids the access of a new terminal. In this embodiment, bits '11' represent that a corresponding base station makes restrictions on accessed terminals, bits '00' represent that a corresponding base station makes no restrictions on accessed terminals. The corresponding bits of the auxiliary detection signaling S1$c$, S2$c$ and S4$c$ are '00' if it is assumed that the Macro BS1, the Femto BS2 and the Femto BS4 make no restrictions on the accessed terminals, and the corresponding bits of the auxiliary detection signaling S3$c$ are '11' and a terminal group identifier of a terminal which is allowed to access the Femto BS3 is '0101' if it is assumed that the Femto BS3 makes restrictions on the accessed terminals.

The Macro BS1, the Femto BS2 and the Femto BS3 respectively adopt different code word sequences in a group of known orthogonal code word sequence sets to perform spectrum spreading on S1$c$, S2$c$ and S3$c$ and then send the spread S1$c$, S2$c$ and S3$c$ at the carrier frequency Fc.

In this embodiment, the Macro BS1 notifies, through corresponding signaling, the MS1 of the location information of the resource blocks, where the Femto BS2, the Femto BS3 and the Femto BS4 send auxiliary detection signaling, and the code word sequences adopted by the Femto BS2 and the Femto BS3. The terminal MS1 decodes the auxiliary detection signaling, determines the Femto BS2 and the Femto BS3 to be accessible target base stations, further determines that the Femto BS2 makes no restrictions on the accessed terminals, and the Femto BS4 makes restrictions on the accessed terminals and only allows access of a terminal with a terminal group identifier '0101'. The MS1 can obtain basic information of the Femto BS2 and the Femto BS3 from the current serving base station Macro BS1 if a group identifier of the terminal MS1 is '0101'; the MS1 can obtain basic information of the Femto BS2 from the current serving base station Macro BS1 if the group identifier of the terminal MS1 is not '0101'.

As stated above, through the technical solutions provided in the embodiments of the present invention, each base station in a wireless communication network can send auxiliary detection signaling at the working carrier frequencies of other base stations or a common carrier frequency so that an MS can obtain the auxiliary detection signaling sent by the each base station only by searching for a carrier frequency, and as a consequence, a channel estimation on the each base station can be realized, and switching can be conducted according to the result of the channel estimation. The present invention addresses the problem existing in the prior art that a signaling overhead is high and a search performed by an MS is complicated during switching and therefore saves signaling overhead, reduces the searching complexity of the MS and facilitates power saving.

The mentioned above is only preferred embodiments of the invention but not a limitation to the invention, various modification and variations can be devised by those skilled in this art, and it should be understood that any modification, equivalent substitute and improvement devised without departing from the spirit and scope of the invention belong to the protection scope of the invention.

What is claimed is:

1. A method for sending auxiliary detection signaling, each base station in a base station group respectively determining itself as a first base station, comprising:
   notifying, by a first base station, through a backhaul network other base stations in the base station group of a location of a time-frequency resource for sending auxiliary detection signaling at a carrier frequency of the first base station; or notifying, by an upper-layer network element of base stations in the base station group, all base stations in the base station group of a location of a time-frequency resource for sending auxiliary detection signaling at a carrier frequency of a first base station;
   notifying, by the first base station, through a broadcast channel a terminal covered by the first base station of the location of the time-frequency resource;
   respectively sending, by any one of other base stations in the base station group, auxiliary detection signaling at the carrier frequency of the first base station to the terminal covered by the first base station according to the location of the time-frequency resource;
   receiving, by the terminal covered by the first base station, at the carrier frequency all or part of the auxiliary detection signaling from the other base stations according to the location of the time-frequency resource, and determining a target base station to be switched to according to the received auxiliary detection signaling.

2. The method according to claim 1, wherein the base station group comprises all or part of base stations in a predetermined range.

3. The method according to claim 2, wherein the base stations in the predetermined range comprise:
   one or more base stations, and femto base stations, and/or micro base stations, and/or pico base stations covered by the one or more base stations; or
   multiple base stations working at all or part of available carrier frequency resources, which comprises femto base stations, micro base stations, pico base stations or macro base stations.

4. The method according to claim 1, wherein the carrier frequency comprises one or more carrier frequencies at which the first base station works.

5. The method according to claim 1, wherein the location of the time-frequency resource, where the auxiliary detection signaling is sent, is determined in any of the following ways:
configured by a standard default;
determined by the first base station;
determined through a negotiation between the first base station and the other base stations;
determined by the upper-layer network element of base stations in the base station group;
determined through a negotiation between the upper-layer network element and the first base station;
determined through a negotiation among the upper-layer network element, the first base station and the other base stations.

6. The method according to claim 1,
wherein the upper-layer network element comprises one of: a base station controller, an access serving network, a connection serving network and a gateway of a core network.

7. The method according to claim 1, notifying, by the first base station, through a broadcast channel the terminal covered by the first base station of the location of the time-frequency resource in a predetermined manner; wherein the predetermined manner is unicasting, multicasting or broadcasting.

8. The method according to claim 5, wherein the time-frequency resource is located within a downlink sub-frame or within a transformation gap between an uplink sub-frame and a downlink sub-frame.

9. The method according to claim 1, wherein the auxiliary detection signaling is sent in a signaling format agreed by the terminal, and content contained in the auxiliary detection signaling is that agreed by the terminal.

10. The method according to claim 1, wherein content contained in the auxiliary detection signaling sent by one of the other base stations comprises one of or any combinations of: a pilot sequence of the base station, a synchronous channel of the base station, a type of the base station, an index number of the base station, access limitations regulated by the base station on a terminal, indication information indicative of whether or not the base station can provide services, and indication information indicative of whether or not the base station allows access of more terminals.

11. The method according to claim 1, wherein content contained in the auxiliary detection signaling sent by one of the other base stations comprises access limitations regulated by the base station on a terminal;
wherein the limitations comprise a type and/or an identifier of a terminal that is allowed to access the base station, and/or an identifier of a terminal group that is allowed to access the base station.

12. The method according to claim 10, wherein time-frequency resources occupied by the other base stations to send the auxiliary detection signaling at the carrier frequency of the first base station are all or partially identical or all different.

13. The method according to claim 12, wherein the time-frequency resources occupied by the other base stations to send the auxiliary detection signaling at the carrier frequency of the first base station are identical; and the auxiliary detection signaling sent by each base station is a code word sequence, code word sequences are mutually orthogonal or quasi-orthogonal.

14. The method according to claim 12, wherein the time-frequency resource blocks occupied by the other base stations to send the auxiliary detection signaling at the carrier frequency of the first base station are identical; the auxiliary detection signaling sent by each base station is signaling generated by conducting spectrum spreading on predetermined information with a predetermined sequence as spread spectrum codes, wherein predetermined sequences are code word sequences that are mutually orthogonal or quasi-orthogonal.

15. The method according to claim 1, further comprising: after receiving all or part of the auxiliary detection signaling, the terminal determining a target base station whose information is required to be acquired according to the received auxiliary detection signaling, and sending a request to a current serving base station to request related information of the target base station.

16. A method for sending auxiliary detection signaling, comprising:
notifying, by an upper-layer network element of base stations in the base station group, all base stations in the base station group of a location of a time-frequency resource for sending auxiliary detection signaling at a common carrier frequency;
notifying, by a serving base station covering a terminal in the base station group, through a broadcast channel the terminal of the location of the time-frequency resource;
sending, by each of base stations in a base station group, auxiliary detection signaling at the common carrier frequency to the terminal according to the location of the time-frequency resource;
receiving, by the terminal, at the common carrier frequency all or part of the auxiliary detection signaling from all base stations according to the location of the time-frequency resource, and determining a target base station to be switched to according to the received auxiliary detection signaling.

17. The method according to claim 16, wherein the base station group comprises all or part of base stations in a predetermined range.

18. The method according to claim 17, wherein the base stations in the predetermined range comprise:
one or more base stations, and femto base stations, and/or micro base stations, and/or pico base stations covered by the one or more base stations; or
multiple base stations working at all or part of available carrier frequency resources, which comprises femto base stations, micro base stations, pico base stations or macro base stations.

19. The method according to claim 16, wherein the common carrier frequency comprises one or more carrier frequencies at which base stations in the base station group are able to send signaling.

20. The method according to claim 16, wherein the location of the time-frequency resources, where each of base stations in the base station group sends the auxiliary detection signaling, is determined in any of the following ways:
configured by a standard default;
determined by base stations sending the auxiliary detection signaling;
determined by the upper-layer network element of the base stations in the base station group;
and determined through a negotiation between the upper-layer network element and the base stations sending the auxiliary detection signaling.

21. The method according to claim 16,
wherein the upper-layer network element comprises one of: a base station controller, an access serving network, a connection serving network and a gateway of a core network.

22. The method according to claim 20, notifying, by the serving base station covering the terminal in the base station group, through a broadcast channel the terminal of the location of the time-frequency resource in a predetermined manner; wherein the predetermined manner is unicasting, multicasting or broadcasting.

23. The method according to claim 20, wherein the time-frequency resources are located within a downlink sub-frame or within a transformation gap between an uplink sub-frame and a downlink sub-frame.

24. The method according to claim 16, wherein the auxiliary detection signaling is sent in a signaling format agreed by the terminal, and content contained in the auxiliary detection signaling is that agreed by the terminal.

25. The method according to claim 16, wherein content contained in the auxiliary detection signaling comprises one of or any combinations of: a pilot sequence of the base station, a synchronization sequence of the base station, a type of the base station, an index number of the base station, access limitations regulated by the base station on a terminal, indication information indicative of whether or not the base station can provide services, and indication information indicative of whether or not the base station allows access of more terminals.

26. The method according to claim 16, wherein content contained in the auxiliary detection signaling comprises access limitations regulated by the base station on a terminal; wherein the limitations comprise a type and/or an identifier of a terminal that is allowed to access the base station, and/or an identifier of a terminal group that is allowed to access the base station.

27. The method according to claim 25, wherein time-frequency resources occupied by the base stations in the base station group to send the auxiliary detection signaling at the same common carrier frequency are all or partially identical or all different.

28. The method according to claim 27, wherein the time-frequency resources occupied by the base stations in the base station group to send the auxiliary detection signaling at the same common carrier frequency are identical; and the auxiliary detection signaling sent by each base station is a code word sequence, code word sequences are mutually orthogonal or quasi-orthogonal.

29. The method according to claim 27, wherein the time-frequency resource blocks occupied by the base stations in the base station group to send the auxiliary detection signaling at the same common carrier frequency are identical; the auxiliary detection signaling sent by each base station is signaling generated by conducting spectrum spreading on predetermined information with a predetermined sequence as spread spectrum codes, wherein predetermined sequences are code word sequences that are mutually orthogonal or quasi-orthogonal.

30. The method according to claim 16, further comprising: after receiving the auxiliary detection signaling at the common carrier frequency, the terminal determining a target base station whose information is required to be acquired according to the received auxiliary detection signaling, and sending a request to a current serving base station to request related information of the target base station.

* * * * *